(12) United States Patent
Ibaragi et al.

(10) Patent No.: US 10,741,802 B2
(45) Date of Patent: Aug. 11, 2020

(54) STEEL FOIL FOR ELECTRICAL STORAGE DEVICE CONTAINER, CONTAINER FOR ELECTRICAL STORAGE DEVICE, AND ELECTRICAL STORAGE DEVICE

(71) Applicants: NIPPON STEEL & SUMITOMO METAL CORPORATION, Tokyo (JP); NIPPON STEEL & SUMIKIN MATERIALS CO., LTD., Tokyo (JP)

(72) Inventors: Masaharu Ibaragi, Tokyo (JP); Koichi Nose, Tokyo (JP); Yasuto Goto, Tokyo (JP); Nobuo Kadowaki, Tokyo (JP); Hiroto Unno, Tokyo (JP)

(73) Assignees: NIPPON STEEL CORPORATION, Tokyo (JP); NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 113 days.

(21) Appl. No.: 15/564,406

(22) PCT Filed: Apr. 7, 2016

(86) PCT No.: PCT/JP2016/061449
§ 371 (c)(1),
(2) Date: Oct. 4, 2017

(87) PCT Pub. No.: WO2016/163483
PCT Pub. Date: Oct. 13, 2016

(65) Prior Publication Data
US 2018/0138468 A1 May 17, 2018

(30) Foreign Application Priority Data
Apr. 9, 2015 (JP) .................................. 2015-080011

(51) Int. Cl.
*H01M 2/02* (2006.01)
*H01M 10/0525* (2010.01)
(Continued)

(52) U.S. Cl.
CPC ............ *H01M 2/0287* (2013.01); *H01G 9/08* (2013.01); *H01G 9/145* (2013.01); *H01G 11/78* (2013.01);
(Continued)

(58) Field of Classification Search
CPC .......... C23C 22/30; H01G 9/035; H01G 9/08; H01G 9/145; H01G 11/58; H01G 11/78;
(Continued)

(56) References Cited

U.S. PATENT DOCUMENTS

| 4,088,544 A | * | 5/1978 | Hutkin | ...................... C25D 1/04 204/281 |
| 4,916,031 A | * | 4/1990 | Kitamura | ............... B29C 66/723 220/62.11 |
| 2009/0029245 A1 | * | 1/2009 | Ibaragi | .................... B32B 15/08 429/176 |

FOREIGN PATENT DOCUMENTS

| CN | 101331020 A | 12/2008 |
| JP | 56-96094 A | 8/1981 |

(Continued)

OTHER PUBLICATIONS

Espacenet Machine Translation of JP 2005-264200 (Year: 2019).*
(Continued)

*Primary Examiner* — Brittany L Raymond
(74) *Attorney, Agent, or Firm* — Birch, Stewart, Kolasch & Birch, LLP

(57) ABSTRACT

A steel foil for an electrical storage device container, including a steel foil, a metal chromium layer layered on the steel foil, and a hydrated chromium oxide layer layered on the
(Continued)

metal chromium layer, in which the concentration of Fe from a surface of the hydrated chromium oxide layer to a depth of 10 nm is less than 10% by mass, the area ratio of a site having an arithmetic mean roughness Ra of 10 nm or more in a visual field of 1 μm at the surface of the hydrated chromium oxide layer is less than 20%, and a site having an arithmetic mean roughness Ra of less than 10 nm in a visual field of 1 μm has an arithmetic mean roughness Ra of 3 nm or less in a visual field of 1 μm at the surface of the hydrated chromium oxide layer, is adopted.

8 Claims, 25 Drawing Sheets

(51) Int. Cl.
    *H01G 9/035*     (2006.01)
    *H01G 9/08*     (2006.01)
    *H01G 9/145*     (2006.01)
    *H01G 11/78*     (2013.01)
    *H01G 11/58*     (2013.01)

(52) U.S. Cl.
    CPC ....... *H01M 2/0277* (2013.01); *H01M 2/0285* (2013.01); *H01M 10/0525* (2013.01); *H01G 9/035* (2013.01); *H01G 11/58* (2013.01); *H01M 2300/0017* (2013.01)

(58) Field of Classification Search
    CPC ............. H01M 2/0277; H01M 2/0285; H01M 2/0287; H01M 10/0525; H01M 2300/0017
    See application file for complete search history.

(56) References Cited

FOREIGN PATENT DOCUMENTS

| | | | | |
|---|---|---|---|---|
| JP | 5-346000 | A | 12/1993 | |
| JP | 7-62596 | A | 3/1995 | |
| JP | 7-90690 | A | 4/1995 | |
| JP | H0762596 | B2 * | 7/1995 | ......... F28D 1/05366 |
| JP | 8-209303 | A | 8/1996 | |
| JP | 9-171802 | A | 6/1997 | |
| JP | 2000-357494 | A | 12/2000 | |
| JP | 2005-264200 | A | 9/2005 | |
| JP | 2005264200 | A * | 9/2005 | ........... C23C 28/322 |
| JP | 2012-33295 | A | 2/2012 | |

OTHER PUBLICATIONS

Espacenet Machine Translation of JP H0762596 (Year: 2019).*
International Search Report for PCT/JP2016/061449 (PCT/ISA/210) dated Jul. 5, 2016.
Written Opinion of the International Searching Authority for PCT/JP2016/061449 (PCT/ISA/237) dated Jul. 5, 2016.
Chinese Office Action, dated Nov. 5, 2019, for Chinese Application No. 201680019246.0, with a partial English translation.

* cited by examiner

[Fig. 1A]
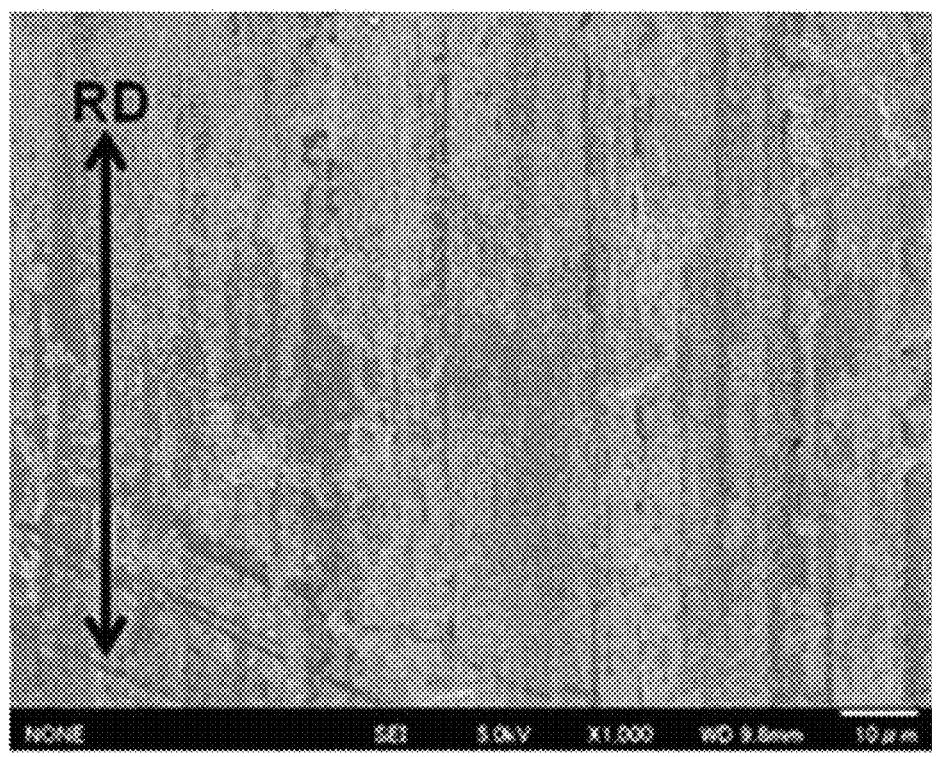

[Fig. 1B]
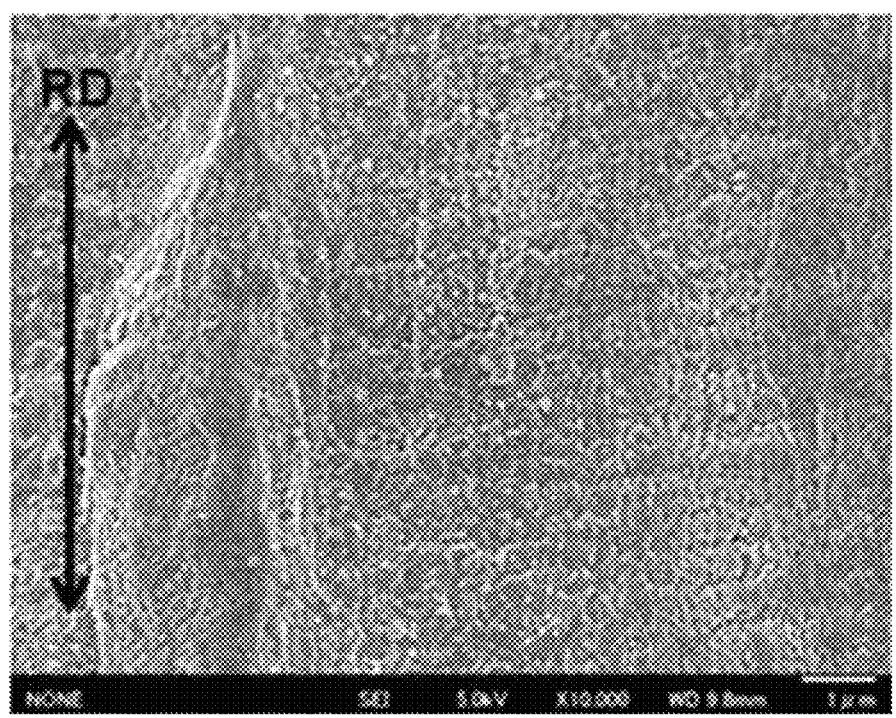

[Fig. 2A]
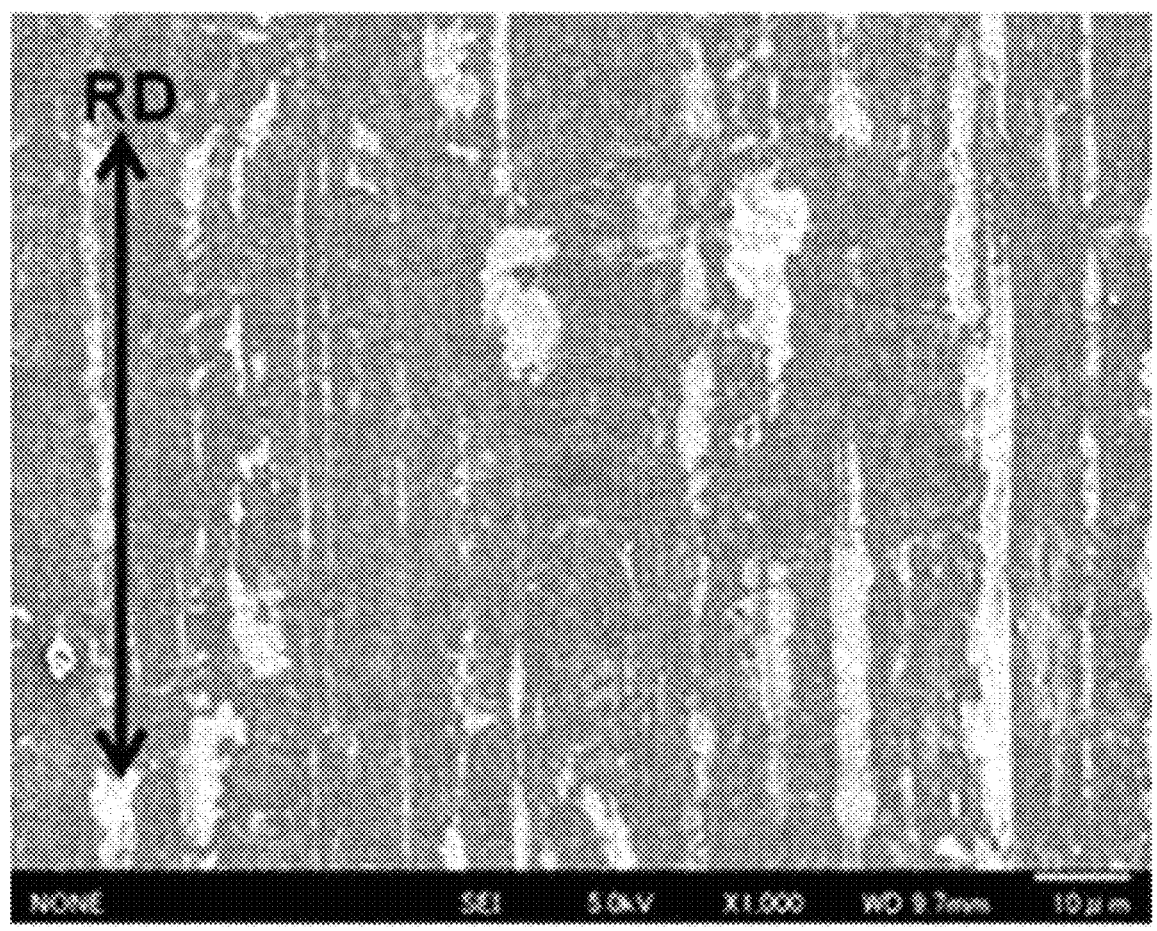

[Fig. 2B]
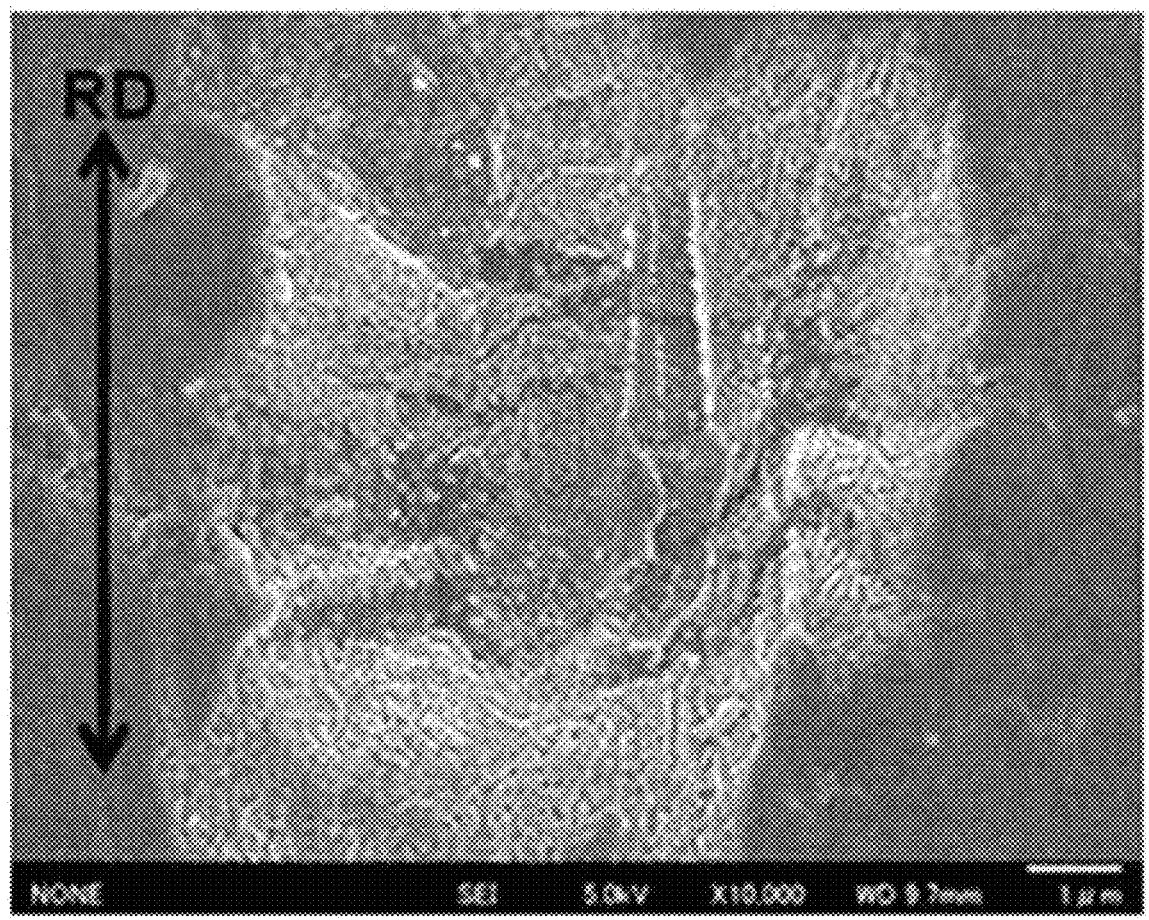

[Fig. 3A]
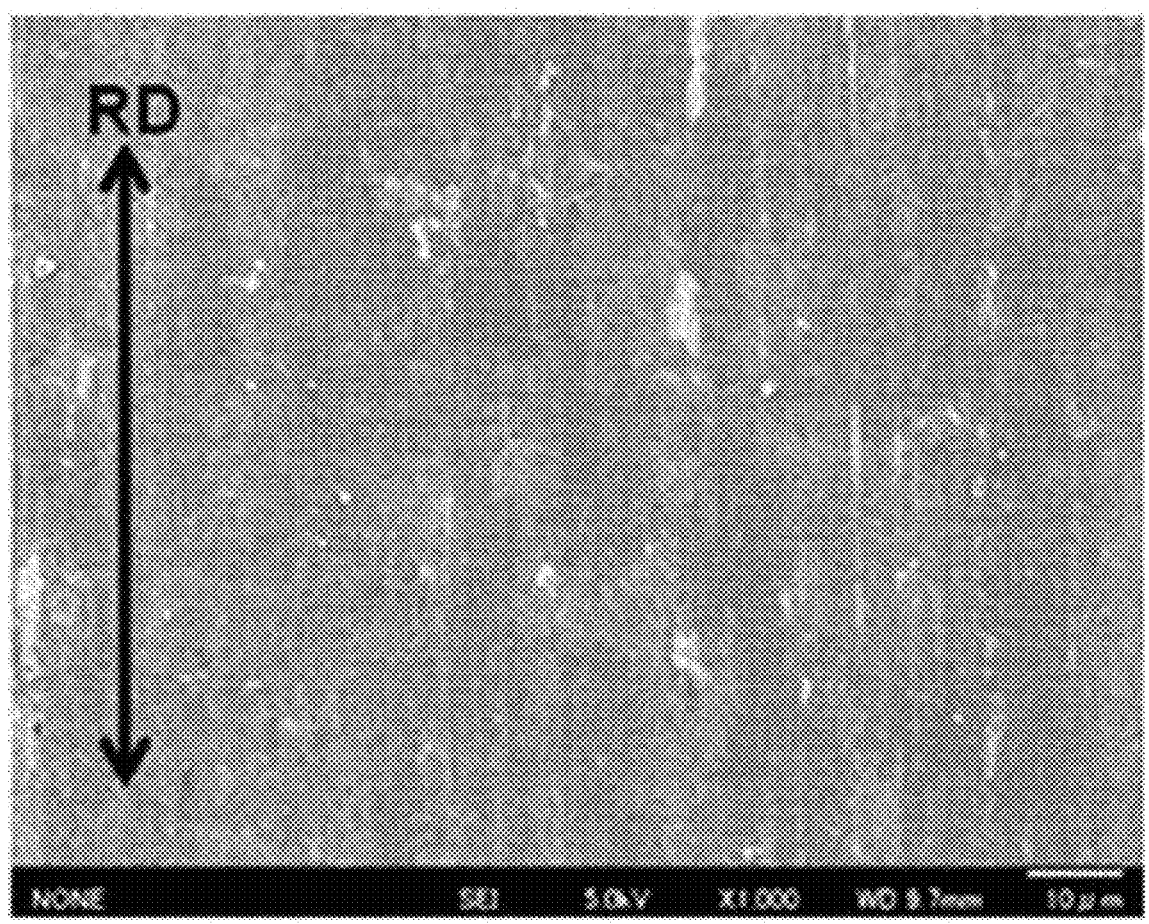

[Fig. 3B]
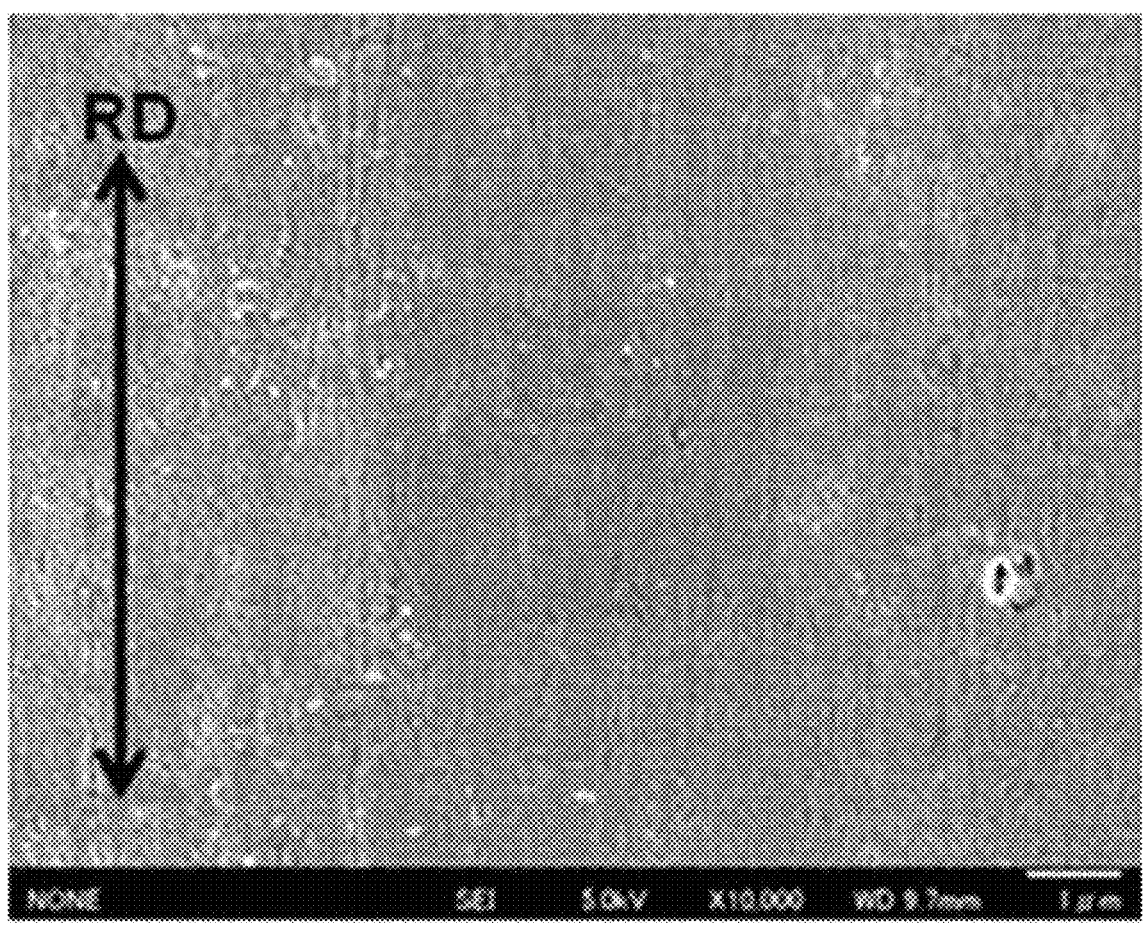

[Fig. 4]
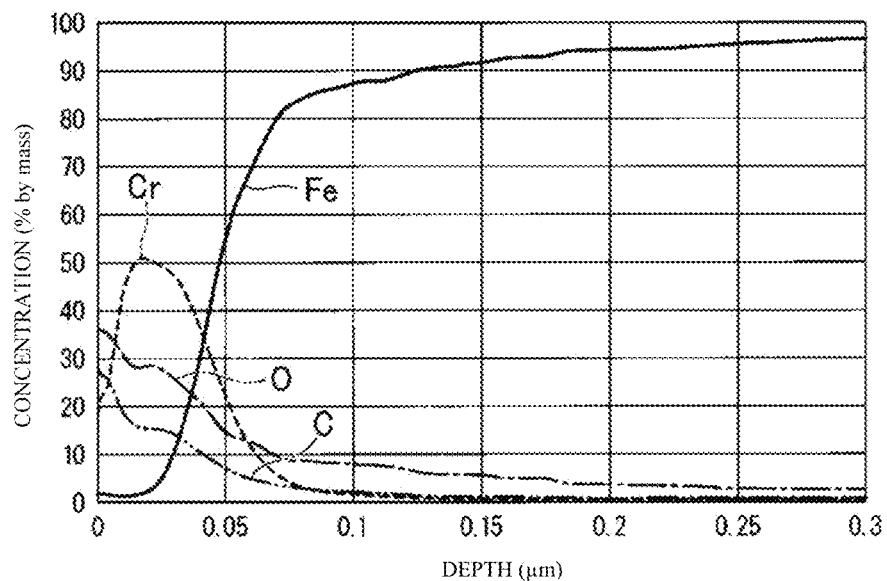
[Fig. 5]
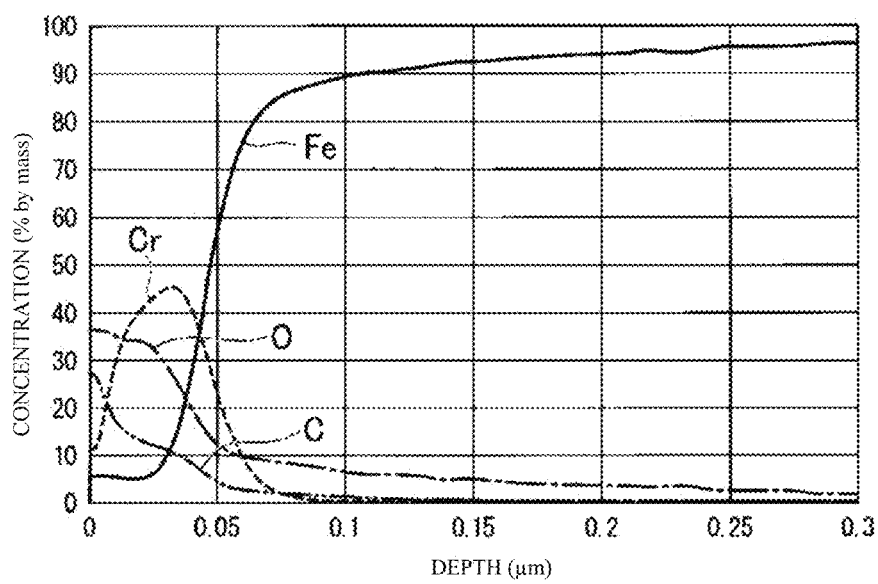

[Fig. 6]
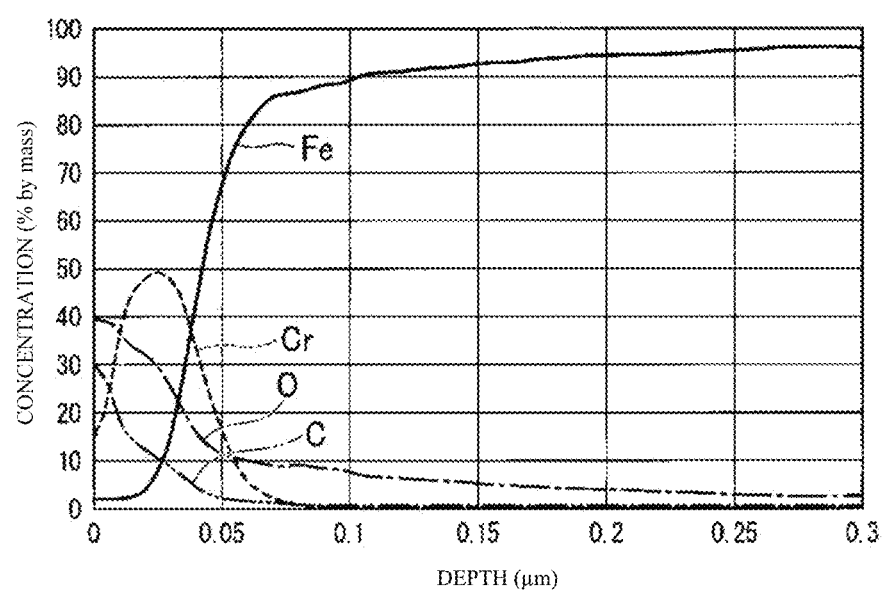

[Fig. 7A]
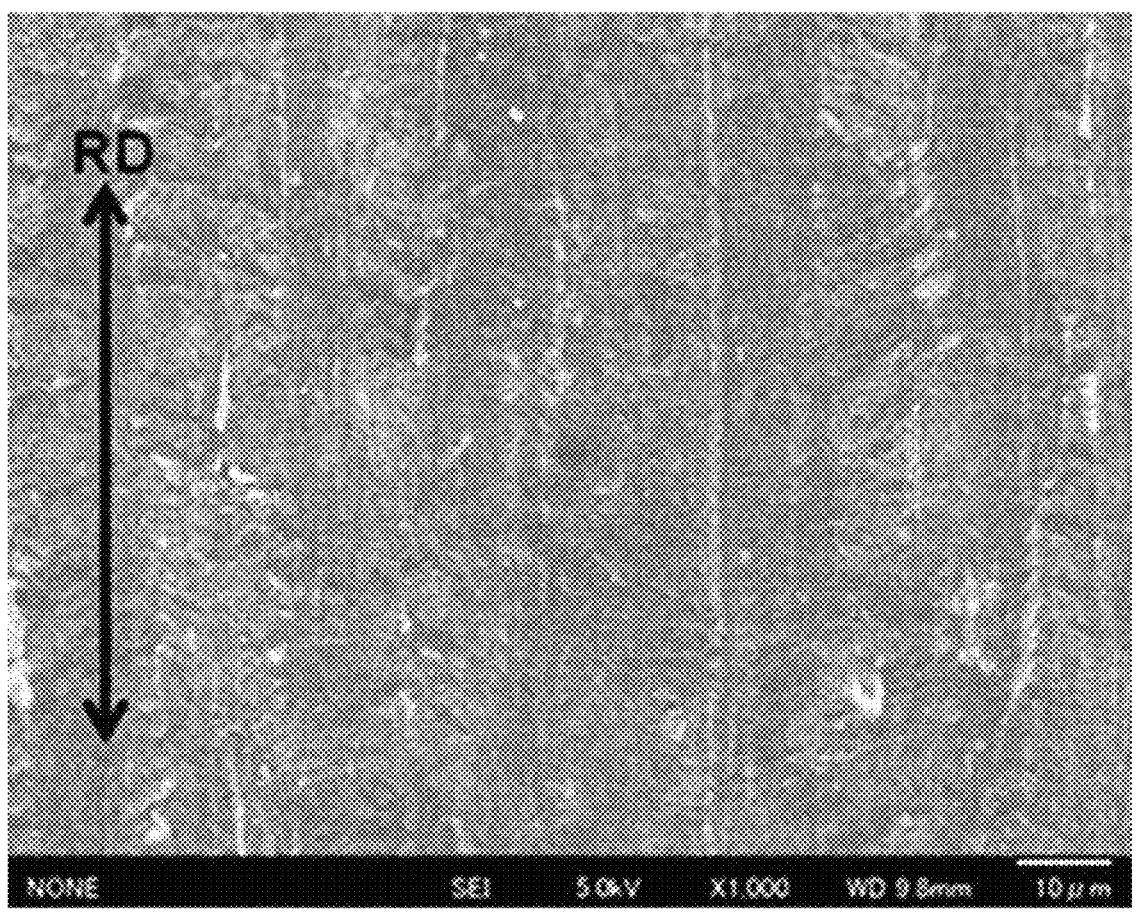

[Fig. 7B]
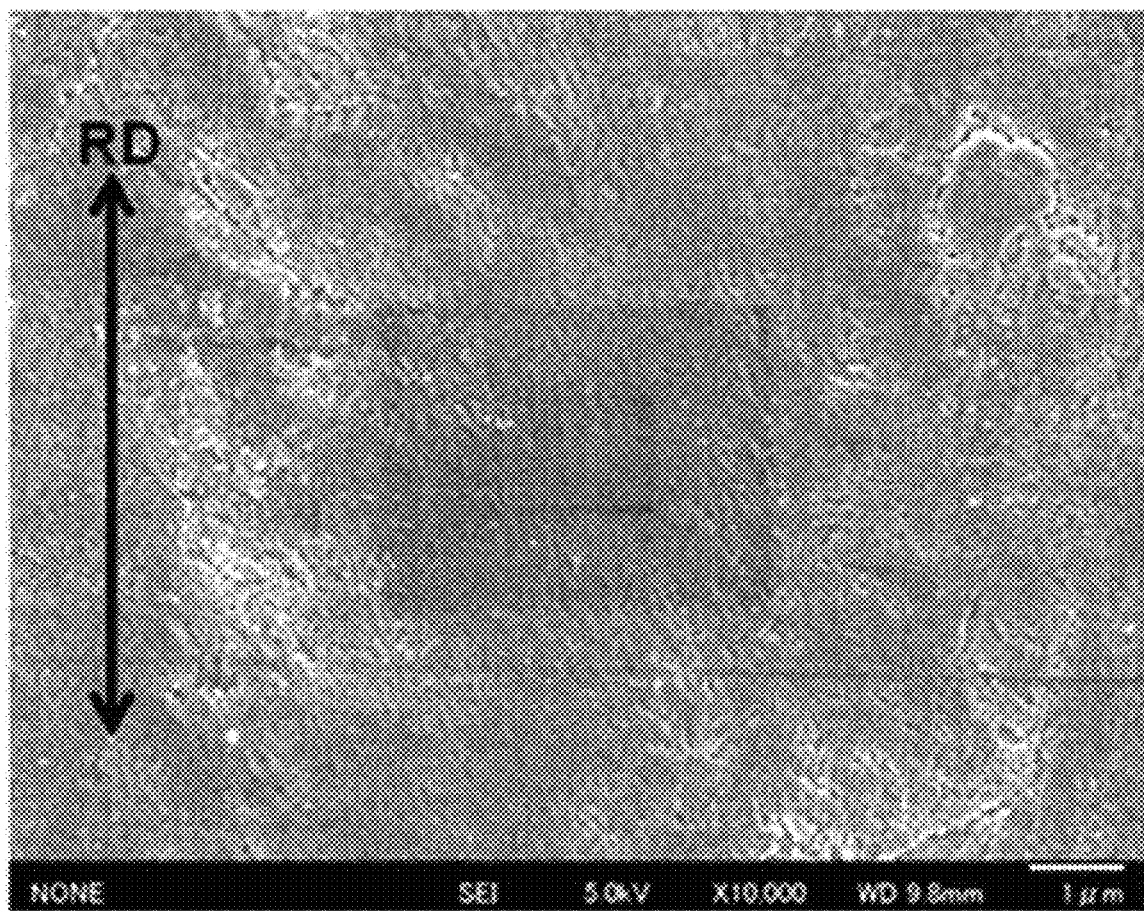

[Fig. 8]
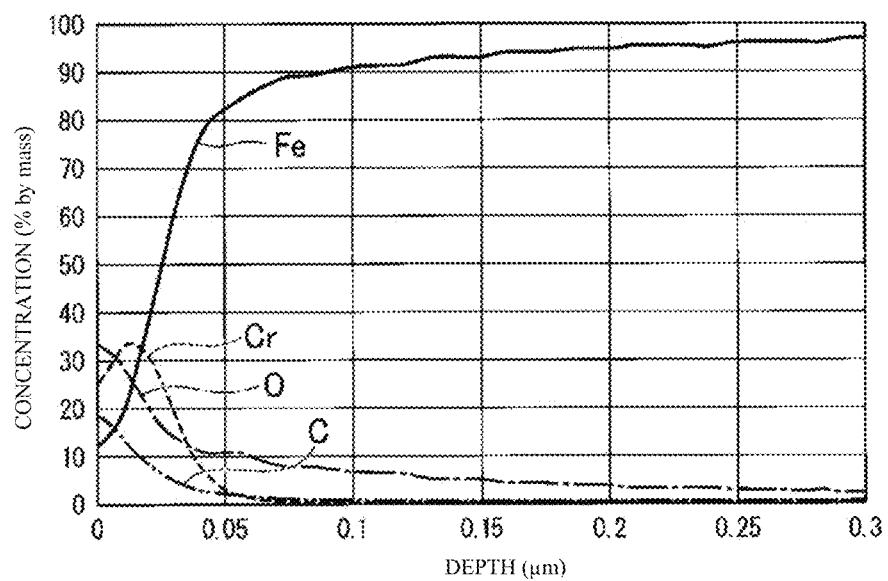

[Fig. 9]

[Fig. 10]
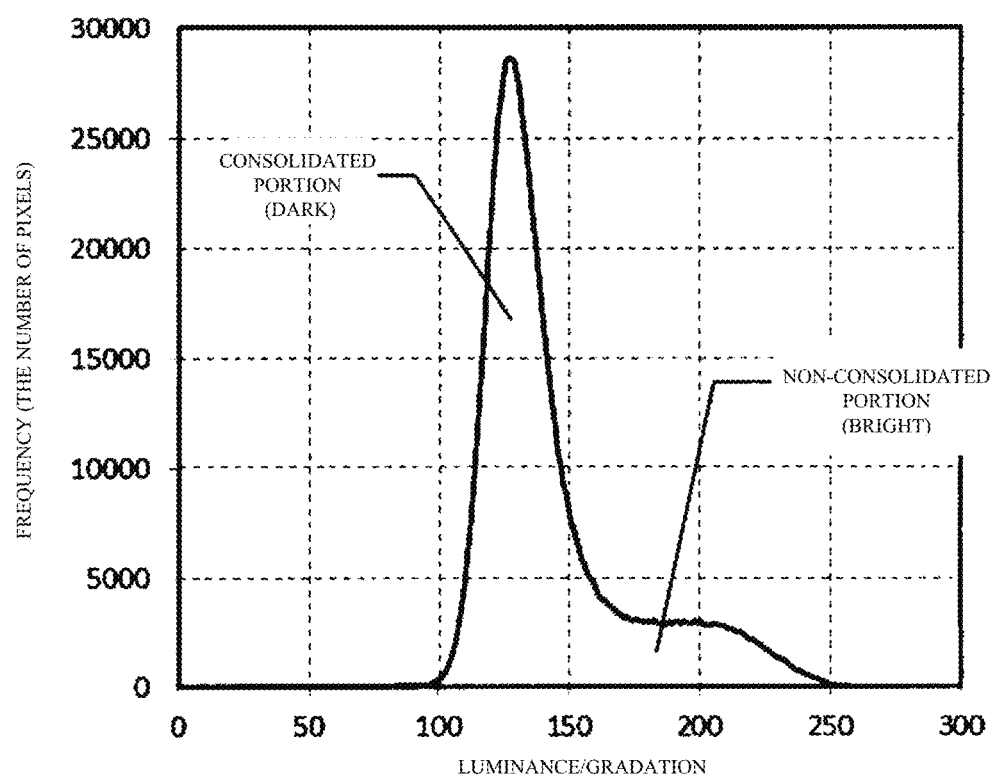

[Fig. 11]
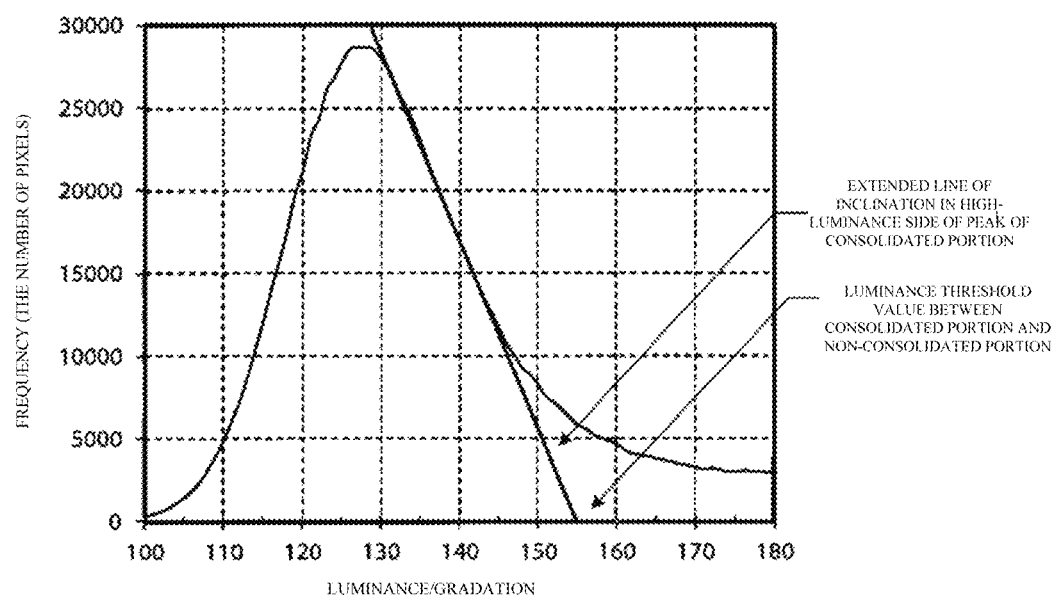

[Fig. 12]

[Fig. 13]

[Fig. 14]
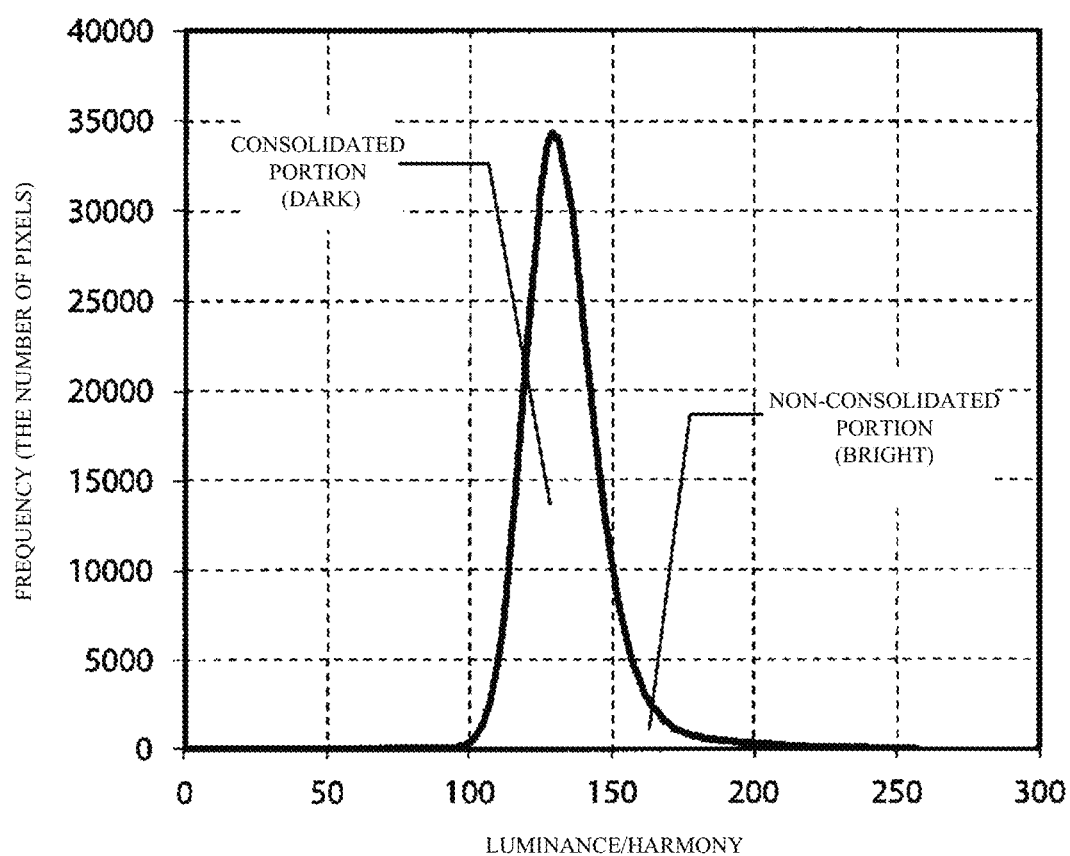

[Fig. 15]
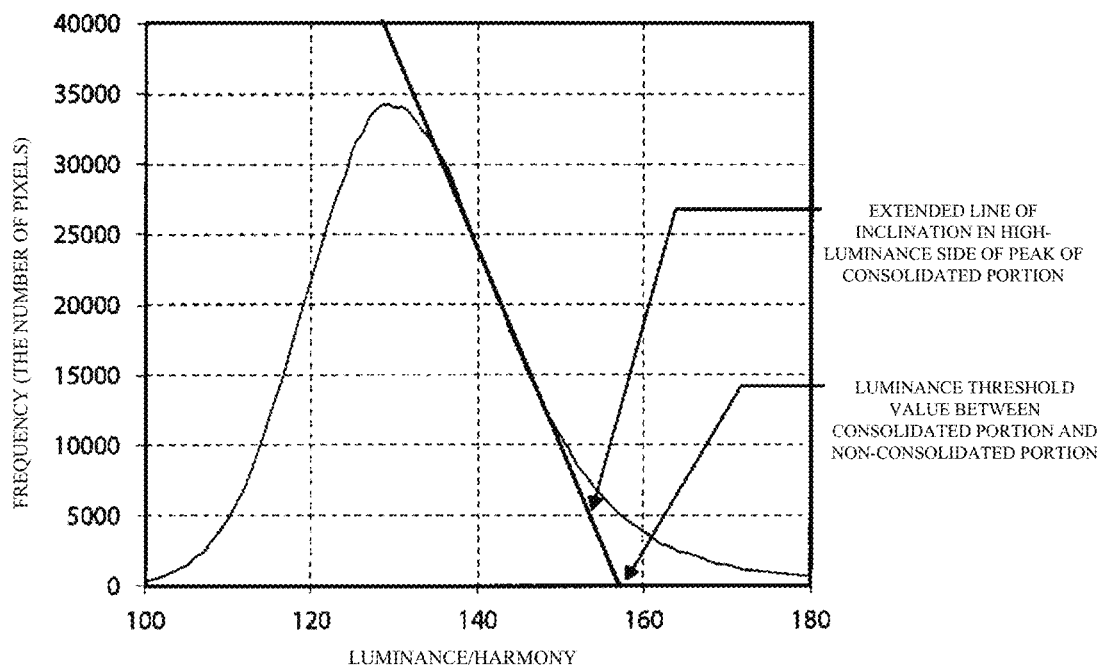

[Fig. 16]

[Fig. 17]
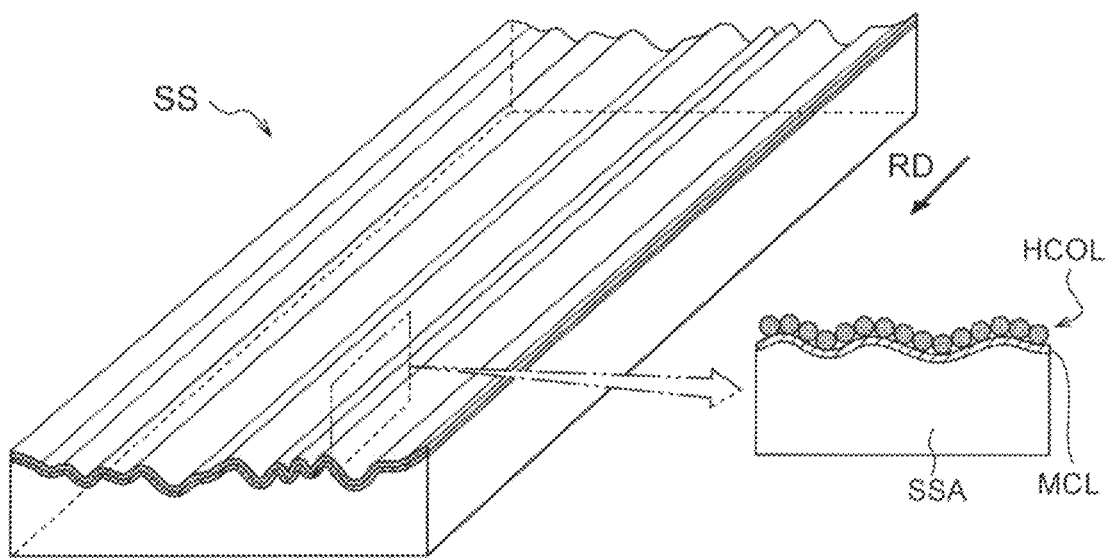

[Fig. 18]
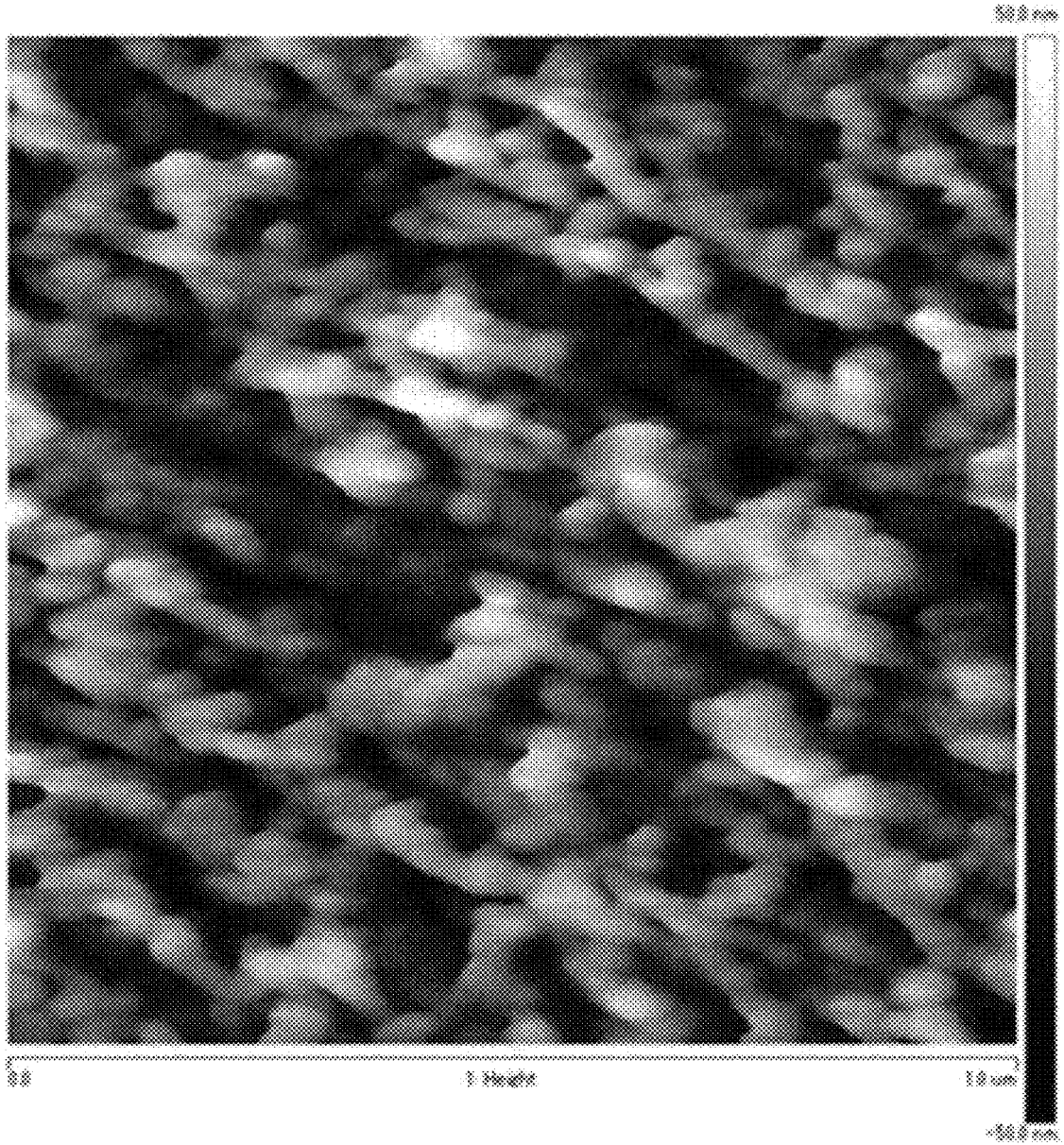

[Fig. 19]
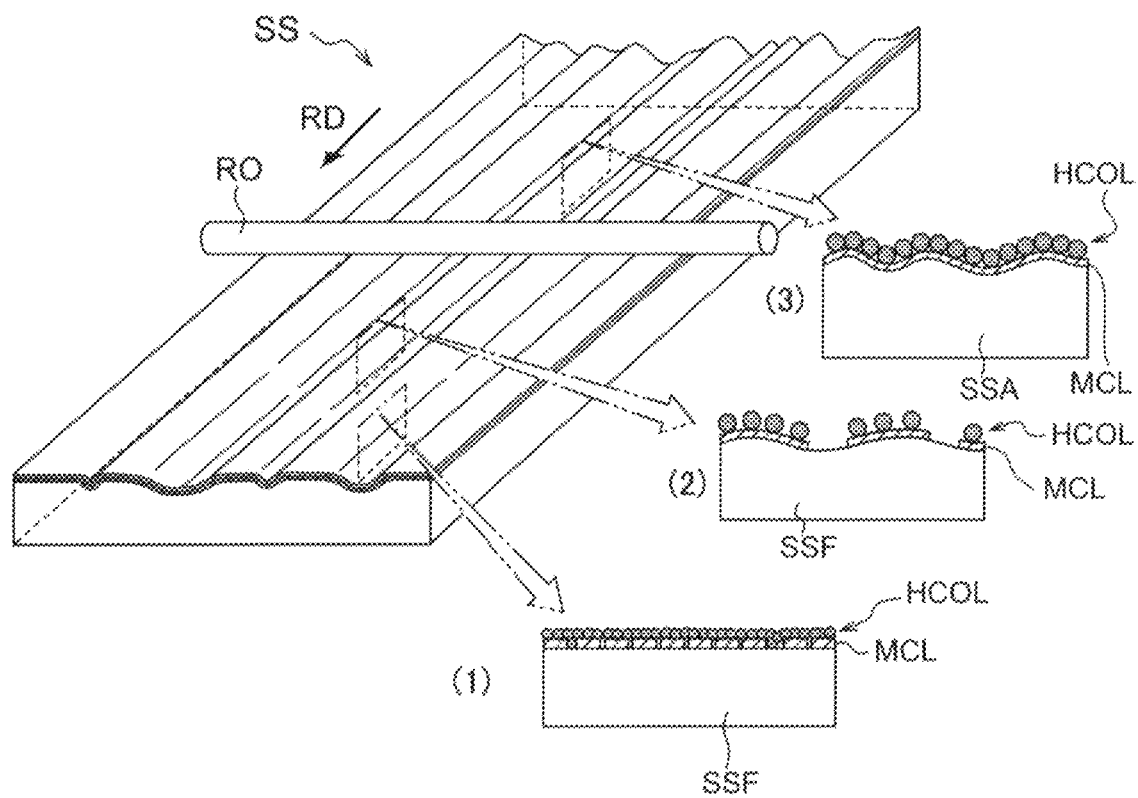

[Fig. 20]
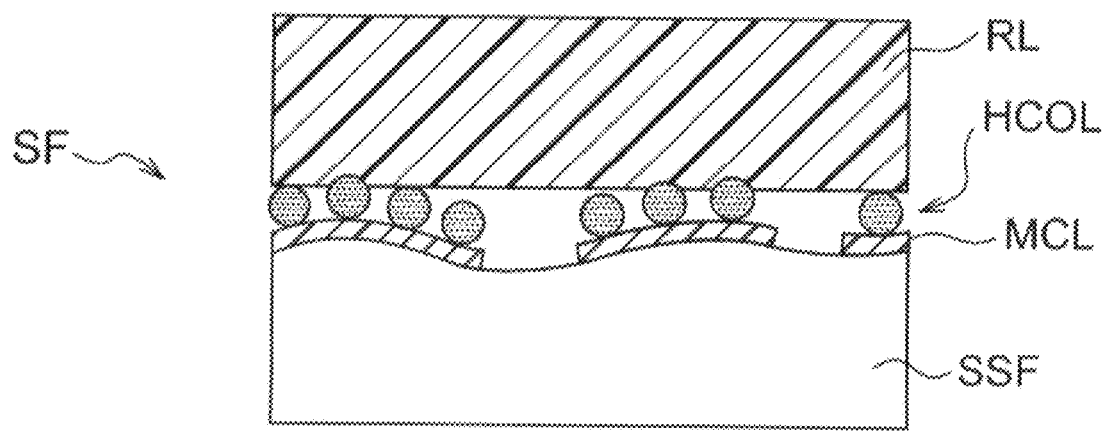
[Fig. 21]
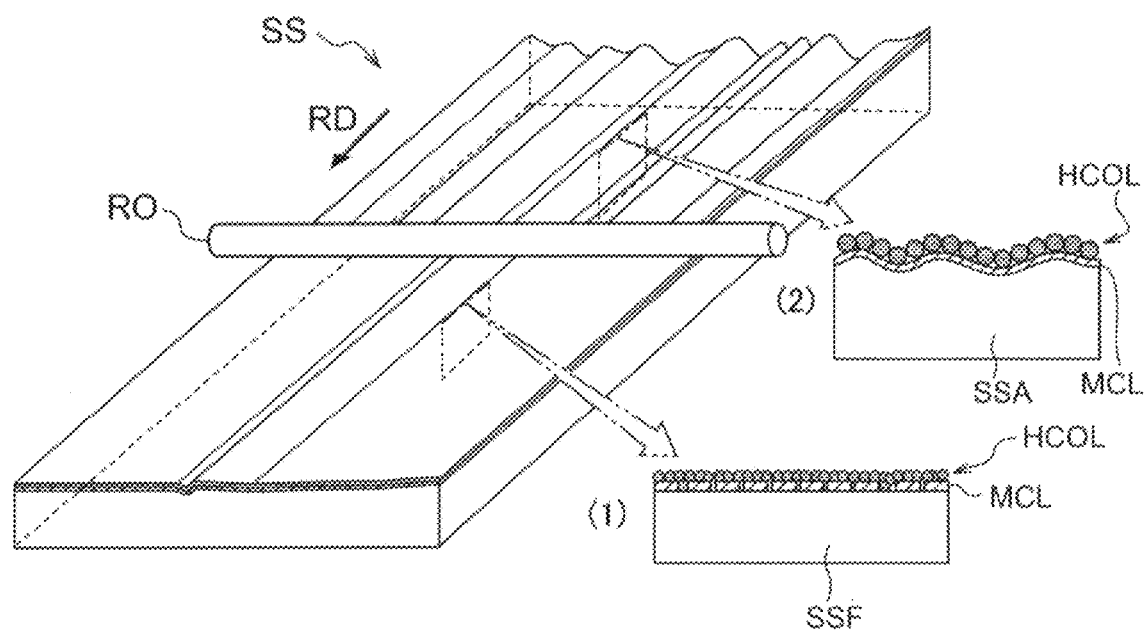

[Fig. 22]
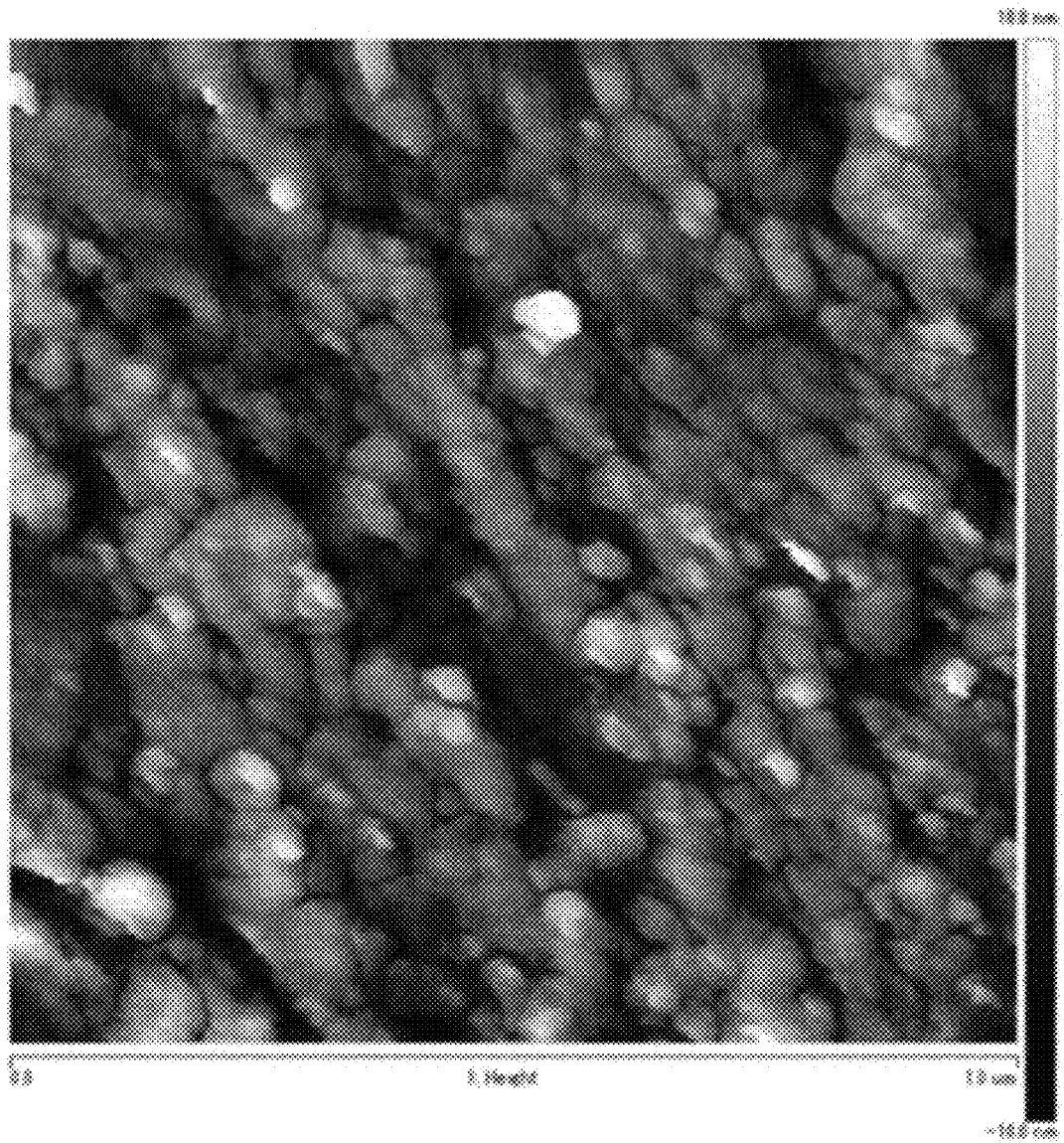

[Fig. 23]
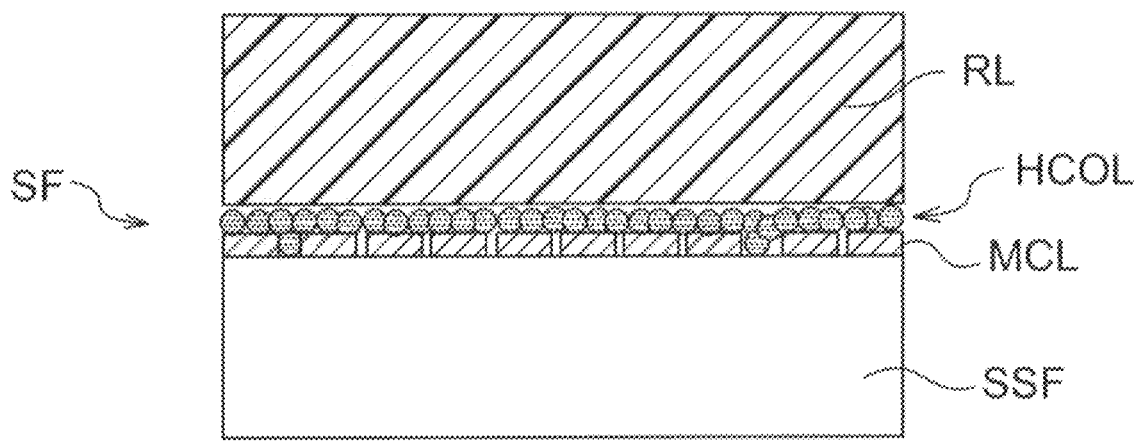

STEEL FOIL FOR ELECTRICAL STORAGE DEVICE CONTAINER, CONTAINER FOR ELECTRICAL STORAGE DEVICE, AND ELECTRICAL STORAGE DEVICE

TECHNICAL FIELD

The present invention relates to a steel foil for an electrical storage device container, a container for an electrical storage device, and an electrical storage device.

BACKGROUND ART

Secondary batteries such as nickel-cadmium batteries, nickel-hydrogen batteries, and lithium-ion batteries have been widely used in electronic instruments and electronic components, particularly in mobile phones, notebook personal computers, video camcorders, artificial satellites, electric or hybrid cars, and the like. Conventionally, cases including nickel-plated cold-rolled steel sheets or plastic cases have been used in secondary batteries using strongly alkaline electrolytes, such as nickel-cadmium batteries and nickel-hydrogen batteries. Batteries using non-aqueous electrolyte, such as lithium-ion batteries, have also been used in the state of wrapping non-aqueous electrolytes put into aluminum pouches in plastic cases or in nickel-plated steel sheet or stainless steel sheet cases.

Reductions in the sizes and weights of secondary batteries have been demanded with reductions in the sizes of electronic and electrical components in recent years. In such trends, attention has been focused on thinning of secondary battery containers as a tool enabling larger quantities of electrolytic solutions and active materials to be put in limited capacities, whereby battery capacities can be increased. However, decreases in the strength of the containers due to the thinning cause a risk that external force or stabbing allows the containers to be deformed or broken, thereby resulting in leakage of the electrolytic solutions which are contents. The leakage of the electrolytic solutions has a high probability of seriously damaging apparatuses in which secondary batteries are put. Therefore, the strength of such a container having a wall thickness of 200 μm or less is insufficient in a case in which the member of the container is plastic or aluminum. Thus, a material having a high strength is required for further thinning the container. It is preferable that the material is a general-purpose material in consideration of mass production.

Examples of materials satisfying such demand characteristics include stainless steel foils. The stainless steel foils are foils obtained by thinning stainless steels to have thicknesses of 200 μm or less. The tensile strengths and Vickers' hardnesses of such metal foils are commonly from 2 to 10 times those of plastic or aluminum, and the metal foils have high strengths. Therefore, the metal foils are promising as materials for thinning secondary battery containers.

In recent years, production of an improved stainless steel foil in which a metal chromium layer and a hydrated chromium oxide layer are homogeneously formed on a surface of a stainless steel foil in order to satisfy severe use conditions demanded in the field of electronics has been attempted (Patent Literature 1).

However, such stainless steel foils have been poor in corrosion resistance in electrolytic solutions, and have been able to be corroded due to non-aqueous electrolytic solutions in the case of using the stainless steel foils in the housings and lead wires of batteries. Thus, a metal foil in which an acid-modified polyolefin resin layer with a barrier property against a substance responsible for corrosion is layered on an aluminum foil subjected to chromium-based surface treatment such as trivalent chromium treatment or chromate treatment is disclosed as a manner of compensating for weakness in the corrosion resistance of such metal foils (Patent Literature 2).

Attempts to improve the workability and corrosion resistance of stainless steel foils have been made as described above. However, conventional stainless steel foils have been often insufficient in view of costs and resistance to non-aqueous electrolytic solutions, and a thin stainless steel foil having excellent resistance to an electrolytic solution has been demanded.

Patent Literature 1: Japanese Patent Application Laid-Open (JP-A) No. H07-62596
Patent Literature 2: JP-A No. 2000-357494

SUMMARY OF INVENTION

Technical Problem

The invention was made under such circumstances with an object to provide a steel foil for an electrical storage device container, which has maintained adhesion to a resin layer even in a non-aqueous electrolytic solution, and has favorable corrosion resistance, a container for an electrical storage device, and an electrical storage device.

The steel foil for an electrical storage device container of the invention can be used not only in a container into which a non-aqueous electrolytic solution is filled, such as a secondary battery or a capacitor, but also in another electronic product. Herein, the steel foil for an electrical storage device container may also be referred to as "steel foil for container."

Solution to Problem

The invention is described as follows.

[1] A steel foil for an electrical storage device container, the steel foil including a steel foil, a metal chromium layer layered on the steel foil, and a hydrated chromium oxide layer layered on the metal chromium layer, wherein
the concentration of Fe from a surface of the hydrated chromium oxide layer to a depth of 10 nm is less than 10% by mass,
the area ratio of a site having an arithmetic mean roughness Ra of 10 nm or more in a visual field of 1 μm at the surface of the hydrated chromium oxide layer is less than 20%, and
a site having an arithmetic mean roughness Ra of less than 10 nm in a visual field of 1 μm has an arithmetic mean roughness Ra of 3 nm or less in a visual field of 1 μm at the surface of the hydrated chromium oxide layer.

[2] The steel foil for an electrical storage device container according to [1], wherein the hydrated chromium oxide layer is layered on the metal chromium layer in a state in which hydrated chromium oxide is filled into a gap in the metal chromium layer, which is finely cracked.

[3] The steel foil for an electrical storage device container according to [1] or [2], wherein the total thickness of the steel foil, the metal chromium layer, and the hydrated chromium oxide layer is 100 μm or less.

[4] The steel foil for an electrical storage device container according to any one of [1] to [3], the steel foil further comprising a polyolefin-based resin layer coated on the surface of the hydrated chromium oxide layer.

[5] A container for an electrical storage device, the container including the steel foil for an electrical storage device container according to [4].

[6] An electrical storage device including the container for an electrical storage device according to [5].

Advantageous Effects of Invention

In accordance with the invention, a steel foil for an electrical storage device container, which has maintained adhesion to a resin layer even in a non-aqueous electrolytic solution, and has favorable corrosion resistance, a container for an electrical storage device, and an electrical storage device can be provided.

BRIEF DESCRIPTION OF DRAWINGS

FIG. 1A is an SEM photograph of a hydrated chromium oxide layer before cold rolling, which is a photograph at a magnification of 1000 times.

FIG. 1B is an SEM photograph of the hydrated chromium oxide layer before the cold rolling, which is a photograph at a magnification of 10000 times.

FIG. 2A is an SEM photograph of the hydrated chromium oxide layer of a steel foil C103, which is a photograph at a magnification of 1000 times.

FIG. 2B is an SEM photograph of the hydrated chromium oxide layer of the steel foil C103, which is a photograph at a magnification of 10000 times.

FIG. 3A is an SEM photograph of the hydrated chromium oxide layer of a steel foil 1, which is a photograph at a magnification of 1000 times.

FIG. 3B is an SEM photograph of the hydrated chromium oxide layer of the steel foil 1, which is a photograph at a magnification of 10000 times.

FIG. 4 is a graph indicating the results of depth analysis of constituent elements in the hydrated chromium oxide layer before the cold rolling.

FIG. 5 is a graph indicating the results of depth analysis of constituent elements in the hydrated chromium oxide layer of the steel foil C103.

FIG. 6 is a graph indicating the results of depth analysis of constituent elements in the hydrated chromium oxide layer of the steel foil 1.

FIG. 7A is an SEM photograph of the hydrated chromium oxide layer of a steel foil C105, which is a photograph at a magnification of 1000 times.

FIG. 7B is an SEM photograph of the hydrated chromium oxide layer of the steel foil C105, which is a photograph at a magnification of 10000 times.

FIG. 8 is a graph indicating the results of depth analysis of constituent elements in the hydrated chromium oxide layer of the steel foil C105.

FIG. 9 is an SEM photograph of 100 μm×90 μm (1070× 963 pixels) cut from the SEM photograph (magnification of 1000 times) of the hydrated chromium oxide layer of the steel foil C103 illustrated in FIG. 2A.

FIG. 10 is a graph indicating a histogram with respect to luminance in the SEM photograph of FIG. 9.

FIG. 11 is a schematic view for explaining a method of determining a luminance threshold value between a consolidated portion and a non-consolidated portion from an enlarged view of the histogram illustrated in FIG. 10.

FIG. 12 is an SEM photograph obtained by binarizing the SEM photograph of FIG. 9 with the luminance threshold value between the consolidated portion and the non-consolidated portion, determined from the enlarged view of the histogram illustrated in FIG. 10.

FIG. 13 is an SEM photograph of 100 μm×90 μm (1070× 963 pixels) cut from the SEM photograph (magnification of 1000 times) of the hydrated chromium oxide layer of the steel foil 1 illustrated in FIG. 3A.

FIG. 14 is a graph indicating a histogram with respect to luminance in the SEM photograph of FIG. 13.

FIG. 15 is a schematic view for explaining a method of determining a luminance threshold value between a consolidated portion and a non-consolidated portion from an enlarged view of the histogram illustrated in FIG. 14.

FIG. 16 is an SEM photograph obtained by binarizing the SEM photograph of FIG. 9 with the luminance threshold value between the consolidated portion and the non-consolidated portion, determined from the enlarged view of the histogram illustrated in FIG. 14.

FIG. 17 is a schematic view illustrating the surface form of a steel sheet before being cold-rolled, on which a metal chromium layer and a hydrated chromium oxide layer are layered.

FIG. 18 is an AFM (atomic force microscope) photograph illustrating a surface of a hydrated chromium oxide layer before cold rolling, in a visual field measuring 1 μm per side.

FIG. 19 is a schematic view for explaining the states of a metal chromium layer and a hydrated chromium oxide layer in a case in which a steel sheet on which the metal chromium layer and the hydrated chromium oxide layer are layered is cold-rolled under usual conditions.

FIG. 20 is a schematic view illustrating a state in which a polyolefin resin layer is layered on the hydrated chromium oxide layer of a steel foil for a container obtained by cold rolling under usual conditions.

FIG. 21 is a schematic view for explaining the states of a metal chromium layer and a hydrated chromium oxide layer in a case in which a steel sheet on which the metal chromium layer and the hydrated chromium oxide layer are layered is cold-rolled under specific conditions.

FIG. 22 is an AFM (atomic force microscope) photograph illustrating a surface of a hydrated chromium oxide layer after cold rolling under specific conditions, in a visual field measuring 1 μm per side.

FIG. 23 is a schematic view illustrating a state in which a polyolefin resin layer is layered on the hydrated chromium oxide layer of a steel foil for a container obtained by cold rolling under specific conditions.

DESCRIPTION OF EMBODIMENTS

A common steel foil for an electrical storage device container included in a container for an electrical storage device is a steel foil obtained by forming a chromium-based surface treatment layer on a steel foil surface, and further layering a polyolefin resin layer on the layer. The chromium-based surface treatment layer is a surface treatment layer formed by chromium-based surface treatment such as trivalent chromium treatment or chromate treatment.

A container for an electrical storage device is always exposed to a non-aqueous electrolytic solution included in an electrical storage device. The non-aqueous electrolytic solution includes an organic solvent and a lithium salt, and use of the non-aqueous electrolytic solution for a long period may result in decomposition of the organic solvent or the lithium salt, thereby generating a substance responsible for corrosion, such as an acid. For example, hydrofluoric acid may be generated as a substance responsible for corrosion in a case in which lithium hexafluorophosphate is used as the lithium salt. In a case in which the substance responsible for corrosion is generated in the organic solvent, the substance may attack a metal substrate, thereby allowing a polyolefin resin layer to exfoliate. In a conventional steel foil for an electrical storage device container included in a container for an electrical storage device, a chromium-based surface treatment layer has been formed on a steel foil surface, thereby preventing the corrosion of the steel foil and suppressing exfoliation of a polyolefin resin layer.

However, a step of forming the chromium-based surface treatment layer on the steel foil surface may have been required, thereby complicating production steps, in the case of producing the conventional steel foil for an electrical storage device container. A plating method or the like results in a relative increase in the arithmetic mean roughness of a surface of a hydrated chromium oxide layer although enabling a chromium-based surface treatment layer including a metal chromium layer and the hydrated chromium oxide layer to be formed on a steel foil surface. In the case of forming a polyolefin resin layer on the hydrated chromium oxide layer and then working the polyolefin resin layer to have the shape of an electrical storage device container, the polyolefin layer and the hydrated chromium oxide layer itself may therefore become subject to breakage, thereby enabling the deterioration of corrosion resistance against a non-aqueous electrolytic solution.

As a result of intensive examination, the present inventors produced a steel sheet on which a metal chromium layer and a hydrated chromium oxide layer were layered (hereinafter also referred to as "surface-treated steel sheet"), and cold-rolled the surface-treated steel sheet to make a steel foil for a container under the conditions that a tension applied in the direction of rolling the steel sheet was relieved, and a rolling load was set at a high level from an initial roll pass, thereby succeeding in producing the steel foil for an electrical storage device container, which had maintained adhesion to a resin layer even in a non-aqueous electrolytic solution, and excellent corrosion resistance against a non-aqueous electrolytic solution, and in which the metal chromium layer and the hydrated chromium oxide layer were layered on the steel foil. Specific description thereof will be given as follows.

First, the surface-treated steel sheet before being cold-rolled has waviness with large corrugation in a C-cross section (cross section perpendicular to rolling direction), and has a surface form with small corrugation in an L-cross section (cross section parallel to rolling direction) (see FIG. 17). In FIG. 17, SS represents the surface-treated steel sheet, SSA represents the steel sheet, MCL represents the metal chromium layer, HCOL represents the hydrated chromium oxide layer, and RD represents the rolling direction.

The hydrated chromium oxide layer is not consolidated, and therefore, has a surface in a rough state (for example, in the state of an arithmetic mean roughness Ra of around 14.7 μm). FIG. 18 illustrates an AFM (atomic force microscope) photograph illustrating the surface of the hydrated chromium oxide layer before the cold rolling, in a visual field measuring 1 μm per side, and the AFM photograph illustrated in FIG. 18 illustrates that a projection having a higher height presents a whiter color, and that a recess having a greater depth presents a darker color, and shows that the surface of the hydrated chromium oxide layer before the cold rolling is in the rough state.

In usual cold rolling, a rolling load is set at a low level in first-half roll passes while applying a strong tension in the longitudinal direction of a steel sheet, and the rolling is performed by gradually increasing the rolling load in a case in which work hardening proceeds.

In a case in which a surface-treated steel sheet having a surface form as in FIG. 18 (see (3) of FIG. 19) is cold-rolled under usual conditions, application of a strong tension in a rolling direction allows the steel sheet to elongate in the rolling direction and to shrink in a sheet width direction. Then, rolling force is applied concentratedly to a projection which is a prominent surface of a surface-treated steel sheet surface having waviness in the sheet width direction. In other words, a metal chromium layer is finely cracked by the rolling and the elongation in the projection of the surface-treated steel sheet surface, the projection follows a steel sheet (ferrite), and therefore, the exposed area of a steel foil obtained by rolling the steel sheet is decreased. A hydrated chromium oxide layer is filled into gaps obtained by finely cracking the metal chromium layer by the rolling and the elongation, and is consolidated by the rolling, thereby microscopically forming a smoothed surface (see (1) of FIG. 19).

However, a recess in the surface-treated steel sheet surface shrinks in the sheet width direction, and therefore, the depth of the recess is increased. Moreover, the recess is elongated in a non-rolling state because a rolling load in initial roll passes is small. In other words, the metal chromium layer is greatly cracked because of being elongated in a non-rolling state in the recess in the surface-treated steel sheet surface, the recess is unable to follow the steel sheet (ferrite), and the exposed area of the steel foil obtained by rolling the steel sheet is increased. Because the hydrated chromium oxide layer is also elongated in a non-rolling state, the hydrated chromium oxide layer is not consolidated, is not filled into the gaps in the metal chromium layer, and is divided (see (2) of FIG. 19).

The state of the metal chromium layer and the hydrated chromium oxide layer, particularly the exposed state of the steel foil obtained by rolling the steel sheet, is maintained even in the case of performing cold rolling to achieve a high rolling reduction.

In FIG. 19, SS represents the surface-treated steel sheet, SSA represents the steel sheet, SSF represents the steel foil, MCL represents the metal chromium layer, HCOL represents the hydrated chromium oxide layer, RO represents a reduction roll, and RD represents the rolling direction.

A steel foil for a container obtained by cold rolling under usual conditions in such a manner is in a state in which both of a metal chromium layer and a hydrated chromium oxide layer are divided at wide spacings, the exposed area of a steel foil (ferrite) is also large, and the number of regions having low barrier properties (i.e., rough regions) is large. Resin adhesion strength per unit area becomes low in a case in which a polyolefin resin layer is formed on the hydrated chromium oxide layer (see FIG. 20). Moreover, both of the metal chromium layer and the hydrated chromium oxide layer are divided at wide spacings, gaps from the resin layer are easily formed, and the intrusion amount of non-aqueous electrolytic solution becomes large. Therefore, corrosion resistance against a non-aqueous electrolytic solution is deteriorated.

In FIG. 20, SF represents the steel foil for the container, SSF represents the steel foil, MCL represents the metal chromium layer, HCOL represents the hydrated chromium oxide layer, and RL represents the polyolefin resin layer.

In contrast, cold rolling of a surface-treated steel sheet having the above-described surface form (see (2) of FIG. 21) under the conditions that a tension applied in the direction of rolling the steel sheet is relieved and a rolling load is set at a high level from an initial roll pass allows the surface-treated steel sheet to be rolled, thereby also elongating the surface-treated steel sheet in a sheet width direction due to the relief of the tension in the direction of rolling the steel sheet. Because the initial rolling load is large, the shrinkage of the surface-treated steel sheet in the sheet width direction is further suppressed in combination with the relief of the tensile in the direction of rolling the steel sheet, and the surface-treated steel sheet is rolled, thereby also elongating the surface-treated steel sheet in the sheet width direction. Thus, a surface-treated steel sheet surface having waviness in the sheet width direction is elongated, whereby the surface-treated steel sheet surface spreads in the sheet width direction, the entire metal chromium layer and the entire hydrated chromium oxide layer are rolled, and rolling force is applied equally to the whole surface.

In other words, the metal chromium layer is finely cracked in both of projections and recesses in the surface-treated steel sheet surface due to rolling and elongation, the projections and the recesses follow a steel sheet (ferrite), and the exposed area of a steel foil obtained by rolling the steel sheet is decreased. The hydrated chromium oxide layer is filled into gaps obtained by finely cracking the metal chromium layer due to the rolling and the elongation, and is consolidated by the rolling, thereby microscopically forming a smooth surface (see (1) of FIG. 21).

In FIG. 21, SS represents the surface-treated steel sheet, SSA represents the steel sheet, SSF represents the steel foil, MCL represents the metal chromium layer, HCOL represents the hydrated chromium oxide layer, RO represents a reduction roll, and RD represents the rolling direction.

The state of the metal chromium layer and the hydrated chromium oxide layer described above is maintained while consolidating the hydrated chromium oxide layer even in the case of performing cold rolling to achieve a high rolling reduction.

FIG. 22 illustrates an AFM (atomic force microscope) photograph illustrating the surface of the hydrated chromium oxide layer after the cold rolling under specific conditions, in a visual field measuring 1 μm per side, and the AFM photograph illustrated in FIG. 22 illustrates that a projection having a higher height presents a whiter color, and that a recess having a greater depth presents a darker color, and shows that the hydrated chromium oxide layer is in the state of having a smoothed surface in comparison with the hydrated chromium oxide layer before the cold rolling.

A steel foil for a container obtained by cold rolling under the above-described specific conditions in such a manner is in a state in which a hydrated chromium oxide layer is consolidated, and the number of regions in which smooth surfaces are finely, densely, and continuously formed is large. A state in which a steel foil (ferrite) is less exposed, and a barrier property and reparability are high is achieved because the hydrated chromium oxide layer is filled into gaps in a metal chromium layer although the metal chromium layer is finely cracked. Resin adhesion strength per unit area becomes high in a case in which a polyolefin resin layer is formed on the hydrated chromium oxide layer (see FIG. 23). The formation of the smooth surface of the hydrated chromium oxide layer precludes formation of a gap from the resin layer and results in the decreased intrusion amount of non-aqueous electrolytic solution. Therefore, corrosion resistance against a non-aqueous electrolytic solution is improved.

In FIG. 23, SF represents the steel foil for a container, SSF represents the steel foil, MCL represents the metal chromium layer, HCOL represents the hydrated chromium oxide layer, and RL represents the polyolefin resin layer.

On the basis of the above findings, the present inventors found that corrosion resistance against a non-aqueous electrolytic solution is improved by allowing a steel foil for an electrical storage device container, on which a metal chromium layer and a hydrated chromium oxide layer are layered, to be a steel foil for a container in which the concentration of Fe from a surface of the hydrated chromium oxide layer to a depth of 10 nm is allowed to be low so that a surface of the hydrated chromium oxide layer is a smooth surface, and a steel foil (ferrite) is less exposed.

In other words, the steel foil for an electrical storage device container of the present embodiment is a steel foil for a container, including a steel foil, a metal chromium layer layered on the steel foil, and a hydrated chromium oxide layer layered on the metal chromium layer, wherein the concentration of Fe from a surface of the hydrated chromium oxide layer to a depth of 10 nm is less than 10% by mass, the area ratio of a site having an arithmetic mean roughness Ra of 10 nm or more in a visual field of 1 μm at the surface of the hydrated chromium oxide layer is less than 20%, and a site having an arithmetic mean roughness Ra of less than 10 nm in a visual field of 1 μm has an arithmetic mean roughness Ra of 3 nm or less in a visual field of 1 μm at the surface of the hydrated chromium oxide layer. In addition, it is preferable to that the total thickness of the steel foil, the metal chromium layer, and the hydrated chromium oxide layer is 100 μm or less in the steel foil for an electrical storage device container of the present embodiment. A polyolefin resin layer may be formed on the hydrated chromium oxide layer.

In the steel foil for an electrical storage device container of the present embodiment, the concentration of Fe from the surface of the hydrated chromium oxide layer to a depth of 10 nm is less than 10% by mass, and therefore, the corrosion resistance against a non-aqueous electrolytic solution can be improved. The area ratio of the site having an arithmetic mean roughness Ra of 10 nm or more in a visual field of 1 μm is less than 20%, the site having an arithmetic mean roughness Ra of less than 10 nm in a visual field of 1 μm has an arithmetic mean roughness Ra of 3 nm or less in a visual field of 1 μm at the surface of the hydrated chromium oxide layer, adhesion to a resin layer can be maintained even in a non-aqueous electrolytic solution, and the corrosion resistance against a non-aqueous electrolytic solution can be improved. In the case of forming a polyolefin resin layer on the hydrated chromium oxide layer and then working the polyolefin resin layer to have the shape of an electrical storage device container, the polyolefin layer and the hydrated chromium oxide layer itself can be prevented from being damaged, and the corrosion resistance against a non-aqueous electrolytic solution can be improved, because the surface roughness is relatively low.

The consolidated hydrated chromium oxide layer in the steel foil for an electrical storage device container of the present embodiment is layered on the metal chromium layer in the state in which hydrated chromium oxide is filled into gaps in the metal chromium layer which is finely cracked by rolling and elongation. The consolidated hydrated chromium oxide layer becomes in a state in which the number of regions which are smoothed surfaces consolidated by the rolling is large. The consolidated hydrated chromium oxide layer is in a state in which the steel foil is less exposed, and a barrier property and reparability are high because the hydrated chromium oxide is filled into the gaps in the metal chromium layer although the metal chromium layer is finely cracked. In a case in which the polyolefin resin layer is formed on the hydrated chromium oxide layer, resin adhesion strength per unit area becomes high, the formation of the smooth surface of the hydrated chromium oxide layer precludes formation of a gap from the polyolefin resin layer and results in the decreased intrusion amount of non-aqueous electrolytic solution, and therefore, the corrosion resistance against a non-aqueous electrolytic solution is improved.

The steel foil for an electrical storage device container of the present embodiment will be described below.

The reason why the steel foil is used as a substrate is because the use of the steel foil is more advantageous in view of a cost and strength than electrolytic treatment, and rolling of the substrate without rupture of the substrate including the metal chromium layer and the hydrated chromium oxide layer requires use of a steel sheet having relatively excellent strength as the substrate and formation of the steel foil by rolling the steel sheet.

The coating amount of metal chromium layer formed on the steel foil is preferably in a range of from 30 to 170 mg/m$^2$, more preferably in a range of from 50 to 170 mg/m$^2$, and still more preferably in a range of from 85 to 120 mg/m$^2$. It may be difficult to sufficiently coat a surface of the steel foil and to secure corrosion resistance against a non-aqueous electrolytic solution in a case in which the metal chromium layer is less than 30 mg/m$^2$. A case in which the metal chromium layer is more than 170 mg/m$^2$ may result in the saturated effect of securing favorable corrosion resistance, and may cause an economic demerit to occur.

The hydrated chromium oxide layer is disposed on the metal chromium layer. The coating amount of hydrated chromium oxide layer is preferably in a range of from 5 to 21 mg/m$^2$, more preferably in a range of from 6 to 21 mg/m$^2$, and still more preferably in a range of from 9 to 14 mg/m$^2$, on a chromium basis. The hydrated chromium oxide layer is important for securing favorable adhesiveness to a polyolefin resin layer in the case of forming the polyolefin resin layer on the hydrated chromium oxide layer. A case in which the amount of hydrated chromium oxide is less than 5 mg/m$^2$ on a chromium basis may result in the deterioration of adhesiveness to the polyolefin resin layer, and therefore is not preferred. A case in which the amount of hydrated chromium oxide is more than 21 mg/m$^2$ on a chromium basis may result in the saturated effect of securing favorable corrosion resistance, may cause an economic demerit to occur, and may cause a problem that a coating film becomes thick, thereby deteriorating appearance.

A method of measuring the presence and layering order of the metal chromium layer and the hydrated chromium oxide layer will be described in Examples described later. Specifically, the distributions of the concentration of Cr and the concentration of O are determined by glow discharge optical emission spectrometry while starting etching of a surface of the steel foil for a container by argon sputtering. As a result, the presence and layering order of the metal chromium layer and the hydrated chromium oxide layer can be confirmed.

Specific description will be given with reference to FIG. 6 illustrating the results of depth analysis of constituent elements in the hydrated chromium oxide layer of a steel foil 1. The concentration of Cr peaks at a depth of around 25 nm from a surface. The metal chromium layer is presumed to be formed in the vicinity of the peak of the concentration of Cr. The concentration of O peaks at the surface, and gradually decreases. Hydrated chromium oxide is in a place in which Cr and O exist, and is therefore presumed to be formed from the surface to a position at which the concentration of Cr peaks. The boundary between the metal chromium layer and the hydrated chromium oxide layer is not necessarily flat.

An Fe concentration of less than 10% by mass from a surface of the hydrated chromium oxide layer to a depth of 10 nm is required for improving corrosion resistance against a non-aqueous electrolytic solution. A case in which a large amount of Fe is included in the hydrated chromium oxide layer is not preferred because of allowing Fe to serve as the origin of corrosion, and resulting in the great deterioration of corrosion resistance against a non-aqueous electrolytic solution in the hydrated chromium oxide layer. The concentration of Fe is preferably less than 5% by mass.

The area ratio of a site having an arithmetic mean roughness Ra of 10 nm or more at the surface of the hydrated chromium oxide layer is less than 20% with respect to the entire surface of the hydrated chromium oxide layer. In other words, the area ratio of a region having an arithmetic mean roughness Ra of less than 10 nm is 80% or more of the entire portion. The arithmetic mean roughness Ra of the site having an arithmetic mean roughness Ra of less than 10 nm is 3 nm or less. The arithmetic mean roughness Ra of the site having an arithmetic mean roughness Ra of less than 10 nm is the mean value of values obtained by measuring plural sites having an arithmetic mean roughness Ra of less than 10 nm.

A film and the hydrated chromium oxide layer itself are suppressed from being damaged in the case of layering the polyolefin resin layer because the area ratio of a region having a large surface roughness is low, and the surface roughness itself of a region having a small surface roughness is also small, in the steel foil for an electrical storage device container according to the present embodiment, as described above. In a case in which the steel foil for an electrical storage device container is worked to make an electrical storage device container, the polyolefin resin layer and the hydrated chromium oxide layer itself are also suppressed from being damaged, thereby enhancing resistance to an electrolytic solution.

The area ratio of the site having an arithmetic mean roughness Ra of 10 nm or more is preferably less than 15%, and more preferably less than 7.5%. The area ratio of the region having an arithmetic mean roughness Ra of less than 10 nm is preferably 85% or more, and more preferably 92.5% or more.

The lower limit of the area ratio of the site having an arithmetic mean roughness Ra of 10 nm or more is not the particularly restricted, and is not 0% from a practical implementation viewpoint.

The arithmetic mean roughness Ra of the site having an arithmetic mean roughness Ra of less than 10 nm is preferably 2.5 or less. The lower limit of the arithmetic mean roughness Ra of the site having an arithmetic mean roughness Ra of less than 10 nm is not particularly restricted, and is not 0 nm from a practical implementation viewpoint.

Such an arithmetic mean roughness Ra is measured in a region in a visual field of 1 μm. "In visual field of 1 μm" means the range of a square having a height and width of 1 μm. A case in which the measurement range of the arithmetic surface roughness is greater than the range is not preferred because the waviness of the surface of the hydrated chromium oxide layer may be measured as a surface roughness.

A method of measuring an arithmetic surface roughness Ra in a visual field of 1 μm will now be described.

The surface form of a rolled portion in which the hydrated chromium oxide layer is consolidated has an arithmetic mean roughness Ra (hereinafter also simply referred to as "Ra") of a nanometer (nm) level in a visual field of 1 μm because of including very small recesses and projections. A probe of which the leading end has a curvature radius of a micron meter (μm) level is incapable of accurately tracing recesses and projections of a nm level, and measurement of an Ra of such a nm level requires use of a probe of which the leading end has a curvature radius of a nm level. Specifically, an Ra is measured using a probe of which the leading end has a curvature radius of from 6 to 15 nm.

Although an apparatus for measurement of the Ra of a micro region is not particularly restricted as long as being a measurement apparatus including the above-described probe of which the leading end has a curvature radius of from 6 to 15 nm, the measurement is practically performed using a scanning probe microscope. Description in which an atomic force microscope (AFM) is used as the scanning probe microscope will be given below.

In the case of representing a surface of a sample as an XY plane using an X-axis and a Y-axis, the atomic force microscope enables the recesses and projections of the surface to be represented as displacements in a Z-axis direction perpendicular to the XY plane. In other words, the atomic force microscope enables the recesses and projections of the sample to be measured as a three-dimensional (X, Y, Z) shape.

Accordingly, two-dimensional data (X-Z plane and Y-Z plane) is obtained as a cross-sectional profile with the atomic force microscope, and therefore, an arithmetic mean roughness Ra may be calculated on the basis of the data in accordance with a method defined by JIS B601. In such a case, the Ra may be calculated by performing data processing using analysis software attached to the atomic force microscope or commercially available analysis software.

The obtained measurement data also includes noises (for example, shape data due to bending of steel foil, macro fault of steel foil surface, and the like) other than the surface form of the hydrated chromium oxide layer. Therefore, the measurement data does not accurately reflect the surface form of the hydrated chromium oxide layer. Thus, removal of such noises enables calculation of a high-precision Ra that accurately reflects the surface form of the steel foil for a container (hydrated chromium oxide layer). A known method may be used as a method of removing the noises, and examples thereof include flattening treatment in the case of calculating an Ra.

In the flattening treatment, polynomial (from zero-order to around cubic) expressions are fitted to a profile curve included in a cross-sectional profile, and the most favorably fitted polynomial expression is selected. Then, the most favorably fitted polynomial expression is subtracted from the profile curve, thereby performing the flattening treatment of the profile curve. This manipulation is applied to the entire profile curve included in the cross-sectional profile, thereby obtaining a cross-sectional profile from which noises are removed, and of which the flattening treatment is performed.

Scanning and measurement of the region of a quadrangle measuring 1 μm per side as the size of the region of which the Ra is measured enable the measurement of the Ra in a visual field of 1 μm.

It is more desirable that the total thickness of the steel foil, the metal chromium layer, and the hydrated chromium oxide layer is 100 μm or less. This is because in the case of reducing the size and weight of a battery, a thin container is also desired. The lower limit thereof is not particularly limited, and it is desirable that the lower limit is typically 5 μm or more in consideration of a cost or the uniformity of a thickness.

Specific examples of such a polyolefin-based resin layer may include a resin layer of a low density polyethylene, a medium density polyethylene, a high density polyethylene, a linear low density polyethylene, a cross-linked mold polyethylene, a polypropylene, or a mixture of two or more kinds thereof.

The polyolefin-based resin layer may be single-layered or multilayered. The polyolefin-based resin layer may be coated with a resin such as polyolefin, polyester, polyamide, or polyimide, thereby making plural layers.

The preferred range of the thickness of the polyolefin-based resin layer is from 0.5 to 200 μm, and still more preferably from 15 to 100 μm. Even in the case of layering a resin such as polyolefin, polyester, polyamide, or polyimide on the upper layer of the polyolefin-based resin layer, the range of the thickness of all the layers layered one on another is preferably from 0.5 to 200 μm, and still more preferably from 15 to 100 μm. A case in which the thickness of all the layers is less than 0.5 μm may result in insufficient prevention of permeation of a substance responsible for corrosion contained in a non-aqueous electrolytic solution, and a case in which the thickness of all the layers is more than 200 μm may result in deteriorated workability. Due to the above and the like, such cases are inappropriate for a member for a secondary battery container, and may preclude exhibition of an economic merit (may result in relatively high cost).

It is desirable that the tensile strength of the steel foil for an electrical storage device container according to the present embodiment is from 600 to 1200 MPa. The tensile strength indicates a value at ordinary temperature. In a case in which the tensile strength of the steel foil for an electrical storage device container is less than 600 MPa, the steel foil for a container may be deformed due to expansion and shrinkage of an active material incident to charge and discharge in the case of being used as an electrical storage device container. In a case in which the tensile strength of the steel foil for an electrical storage device container is more than 1200 MPa, it may be difficult to handle the steel foil for a container.

A method of producing the steel foil for an electrical storage device container according to the present embodiment will now be described. The method of producing the steel foil for an electrical storage device container according to the present embodiment includes a step of forming a metal chromium layer and a hydrated chromium oxide layer on a steel sheet, and a cold rolling step of cold-rolling the steel sheet (surface-treated steel sheet) including the metal chromium layer and the hydrated chromium oxide layer to make a steel foil for a container. The steel foil for a container having a specific morphology (steel foil for container including metal chromium layer and hydrated chromium oxide layer) can be produced through such steps. The method of producing the steel foil for an electrical storage device container according to the present embodiment may also include a step of layering a polyolefin resin layer.

The steel sheet used in the production of the steel foil for an electrical storage device container according to the present embodiment is not particularly limited, and any of a hot-rolled steel sheet, a cold-rolled steel sheet, or a cold-rolled annealed steel sheet may be used as the steel sheet. However, cold rolling, described later, of the hot-rolled steel sheet to make a foil of 100 μm or less is often difficult in view of rolling capacity, and is inefficient and noneconomic even if being possible. Accordingly, it is preferable to use the cold-rolled steel sheet or the cold-rolled annealed steel sheet in the production of the steel foil for an electrical storage device container according to the present embodiment.

In the production of the steel foil for an electrical storage device container according to the present embodiment, the component composition of the steel sheet is not particularly limited, either. Addition of a large amount of specific element to the steel sheet for enhancing strength or for improving corrosion resistance is not an essential requirement. It is preferable to use a steel sheet having a common component composition in view of securing rollability described later although a so-called high-strength steel can also be applied. An example of the component composition is described as follows. "%" means "% by mass."

—One Example of Chemical Composition of Steel Sheet—

C: from 0.0001 to 0.1%,
Si: from 0.001 to 0.5%,
Mn: from 0.01 to 1%,
P: from 0.001 to 0.05%,
S: from 0.0001 to 0.02%,
Al: from 0.0005 to 0.2%,
N: from 0.0001 to 0.1%, and
the balance: Fe and impurities.

(C: From 0.0001 to 0.1%)

Although C is an element that enhances the strength of a steel, the strength is excessively increased, thereby deteriorating rollability, in a case in which the steel excessively contains C. The steel foil for an electrical storage device container according to the present embodiment is allowed to have a high strength by work hardening at a high cumulative rolling reduction as described later, and therefore, it is preferable that an original steel material is soft in consideration of the easiness of rolling. Accordingly, it is preferable to set the upper limit of the content of C at 0.1%. The lower limit of the content of C is not particularly defined, and it is preferable to set the lower limit of the content of C at 0.0001% in consideration of the cost of smelting. The content of C is more preferably from 0.001% to 0.01%.

(Si: From 0.001 to 0.5%)

Although Si is an element that enhances the strength of a steel, the strength of the steel is excessively increased, thereby deteriorating the rollability of the steel, in a case in which the steel is allowed to excessively contain Si. Accordingly, it is preferable to set the upper limit of the content of Si at 0.5%. The lower limit of the content of Si is not particularly defined, and it is preferable to set the lower limit of the content of Si at 0.001% in consideration of the cost of smelting. A Si content of from 0.001 to 0.02% is more preferred for securing higher rollability.

(Mn: From 0.01 to 1%)

Although Mn is an element that enhances the strength of a steel, the strength of the steel is excessively increased, thereby deteriorating rollability, in a case in which the steel is allowed to excessively contain Mn. Accordingly, it is preferable to set the upper limit of the content of Mn at 1%. It is not necessary to particularly define the lower limit of the content of Mn. and it is preferable to set the lower limit of the content of Mn at 0.01% in consideration of the cost of smelting. A Mn content of from 0.01 to 0.5% is more preferred for securing higher rollability.

(P: From 0.001 to 0.05%)

Although P is an element that enhances the strength of a steel, the strength of the steel is excessively increased, thereby deteriorating rollability, in a case in which the steel is allowed to excessively contain P. Accordingly, it is preferable to set the upper limit of the content of P at 0.05%. It is not necessary to particularly define the lower limit of the content of P, and it is preferable to set the lower limit of the content of P at 0.001% in consideration of the cost of smelting. A P content of from 0.001 to 0.02% is more preferred for securing higher rollability.

(S: From 0.0001 to 0.02%)

A smaller amount of S is preferred because S is an element that deteriorates the hot workability and corrosion resistance of a steel. It is preferable to set the upper limit of the content of S at 0.02%. It is not necessary to particularly define the lower limit of the content of S, and it is preferable to set the lower limit of the content of S at 0.0001% in consideration of the cost of smelting. A S content of from 0.001 to 0.01% is more preferred for securing higher rollability and obtaining superiority in cost.

(Al: From 0.0005 to 0.2%)

Al is added as an element that deoxidizes a steel. An Al content of 0.0005% or more is preferred for obtaining an effect due to such deoxidization. However, since an excessive content of Al results in the deterioration of the rollability of a steel, it is preferable to set the upper limit of the content of Al at 0.2%. An Al content of from 0.001 to 0.1% is more preferred for securing higher rollability.

(N: From 0.0001 to 0.1%)

A smaller amount of N is preferred because N is an element that deteriorates the hot workability and workability of a steel. Accordingly, it is preferable to set the upper limit of the content of N at 0.1%. It is not necessary to particularly define the lower limit of the content of N, and it is preferable to set the lower limit of the content of N at 0.0001% in consideration of the cost of smelting. A N content of from 0.0001 to 0.004% is more preferred, and a N content of from 0.001 to 0.01% is still more preferred, for obtaining superiority in cost.

(Balance: Fe and Impurities)

The balance of a steel is made up of Fe and impurities. The impurities refer to components that are unavoidably contained in a raw material or that are mixed in a production process, and that are not intentionally allowed to be contained in a steel sheet.

The steel sheet for producing the steel foil for an electrical storage device container according to the present embodiment may further include Ti and/or Nb as additional components. Ti and/or Nb can fix, as a carbide and a nitride, C and N in a steel, whereby the workability of the steel can be improved. In such a case, it is preferable to set the content of Ti at from 0.01 to 0.8% and the content of Nb at from 0.005 to 0.05%.

The steel sheet for producing the steel foil for an electrical storage device container according to the present embodiment further includes, as additional components, one or more elements of B, Cu, Ni, Sn, Cr, or the like as long as the effects of the present embodiment are not impaired.

(Chromium Plating Step and Electrolytic Chromic Acid Treatment Step)

In order to obtain the steel foil for an electrical storage device container according to the present embodiment, a metal chromium layer is formed on a surface of a steel sheet in a chromium plating step, and a hydrated chromium oxide layer is then formed on the metal chromium layer in an electrolytic chromic acid treatment step. In the chromium plating step, the metal chromium layer is formed on the surface of the steel sheet by performing cathode electrolysis in an aqueous solution containing chromic acid as a main component. In the electrolytic chromic acid treatment step, the steel sheet is subjected to electrolytic chromic acid treatment in a non-sulfuric acid type aqueous solution containing, as main components, one or more of chromic acid, a chromate, or a dichromate.

It is preferable that a chromium plating bath is a bath including, as the composition of the chromium plating bath, from 0.75 to 2 mol/L chromic anhydride, from 0.05 to 0.4 mol/L halide, from 0.01 to 0.1 mol/L sulfuric acid, and $Cr^{3+}$. It is preferable to use a bath including from 0.1 to 2 mol/L chromic anhydride, and an inorganic salt or a water-soluble salt thereof in the electrolytic chromic acid treatment.

The coating amount of metal chromium layer formed on the steel sheet in the chromium plating step is set in a range of from 60 to 200 mg/m², and more preferably in a range of from 100 to 140 mg/m². In a case in which the amount of metal chromium layer on the steel sheet is less than 60 mg/m², it may be impossible to sufficiently coat the surface of the steel foil with the metal chromium layer in the case of cold-rolling the surface-treated steel sheet to make the steel foil for a container, and it may be difficult to secure corrosion resistance against a non-aqueous electrolytic solution. A case in which the amount of metal chromium layer on the steel sheet is more than 200 mg/m² may result in the saturated effect of securing favorable corrosion resistance, and may cause an economic demerit to occur.

The coating amount of hydrated chromium oxide layer formed on the steel sheet in the electrolytic chromic acid treatment step is set in a range of from 7 to 25 mg/m², and more preferably in a range of from 10 to 16 mg/m². In a case in which the amount of hydrated chromium oxide layer on the steel sheet is less than 7 mg/m², it may be impossible to set, at 6 mg/m² or more, the coating amount of hydrated chromium oxide layer after the cold rolling of the surface-treated steel sheet to make the steel foil for a container. A case in which the amount of hydrated chromium oxide layer on the steel sheet is more than 25 mg/m² may result in the saturated effect of securing favorable corrosion resistance, may cause an economic demerit to occur, and may cause a problem that a coating film becomes thick, thereby deteriorating appearance.

(Cold Rolling Step)

The steel sheet (surface-treated steel sheet) including the metal chromium layer and the hydrated chromium oxide layer is cold-rolled to make a foil strip having a thickness of 100 μm or less. Through such a procedure, the steel foil for a container is obtained in which the concentration of Fe from a surface of the hydrated chromium oxide layer to a depth of 10 nm is less than 10% by mass, the area ratio of a site having an arithmetic mean roughness Ra of 10 nm or more at the surface of the hydrated chromium oxide layer is less than 20%, and a site having an arithmetic mean roughness Ra of less than 10 nm in a visual field of 1 μm has an arithmetic mean roughness Ra of 3 nm or less at the surface of the hydrated chromium oxide layer.

The cumulative rolling reduction of the cold rolling is from 15% to 80%, preferably from 15% to 30%, and more preferably from 17% to 25%. "Cumulative rolling reduction" is the percentage of a cumulative rolling draft (difference between inlet sheet thickness before first pass and outlet sheet thickness after final pass) to the inlet sheet thickness of a first rolling stand. A case in which the cumulative rolling reduction is small may result in a foil strength of less than 600 MPa. In addition, the case may result in the insufficient consolidation of the hydrated chromium oxide layer, whereby the polyolefin layer and the hydrated chromium oxide layer itself may become easy to break in the case of performing working in the shape of an electrical storage device container, and corrosion resistance against a non-aqueous electrolytic solution may be deteriorated. In addition, the case may make it impossible to achieve a preferred thinness for use in the electrical storage device container. A case in which the cumulative rolling reduction is too high, the concentration of Fe from the surface of the hydrated chromium oxide layer to a depth of 10 nm may be 10% by mass or more.

It is preferable to perform several roll passes in the cold rolling. Specifically, around from 5 to 30 passes are preferred, around from 5 to 25 passes are more preferred, and around from 10 to 20 passes are still more preferred.

It is preferable to set a rolling load per roll pass in a range of around from 50 tons to 60 tons with respect to a material width of around 500 mm. In the usual cold rolling, a load is set at a low level in first-half roll passes, and the rolling load is gradually increased in a case in which work hardening proceeds, whereas in the present embodiment, it is preferable to set a rolling load set at a rather high level from the beginning and to continuously perform rolling several times at the rolling load maintained at the high level.

A tension of around from 29.4 to 49 MPa (from 3 to 5 kg/mm²) is applied in the direction (longitudinal direction) of rolling a steel sheet in usual rolling, whereas it is preferable to apply a weak tension of around from 9.8 to 19.6 MPa (from 1 to 2 kg/mm²) in the present embodiment.

The steel foil for an electrical storage device container according to the present embodiment is produced by cold-rolling, under the above-described conditions, the steel sheet (surface-treated steel sheet) on which the metal chromium layer and the hydrated chromium oxide layer are formed. In the case of rolling the surface-treated steel sheet in a conventional rolling method in which a strong tension is applied in a rolling direction, the steel sheet elongates in the rolling direction and shrinks in a sheet width direction. Then, the metal chromium layer is greatly cracked because of being elongated in a non-rolling state in a recess in a steel sheet surface having waviness in the sheet width direction, the recess is unable to follow a steel sheet (ferrite), and the exposed area of the steel foil obtained by rolling the steel sheet is increased. Because the hydrated chromium oxide layer is also elongated in a non-rolling state, the hydrated chromium oxide layer is not consolidated, is not filled into gaps in the metal chromium layer, and is divided. As a result, a portion in the surface to which Fe is exposed is increased, the surface form of the hydrated chromium oxide layer is also deteriorated (Ra is increased to a value of 3 nm or more), and resistance against an electrolytic solution is deteriorated.

In the present embodiment, a tension in a rolling direction in the case of rolling is relieved, and a steel sheet is rolled to also elongate the steel sheet in a sheet width direction, whereby a steel sheet surface having waviness in the sheet width direction is elongated to spread in the sheet width direction, the entire metal chromium layer and the entire hydrated chromium oxide layer are rolled, and rolling force is applied equally to the whole surface.

In usual rolling, a rolling load is set at a relatively low level in initial roll passes, and the rolling load is gradually enhanced in a case in which work hardening proceeds, whereas in the present embodiment, a relatively high rolling load is applied from the beginning. As a result, shrinkage in the sheet width direction is suppressed because of the combination of the action of crushing in the sheet width direction from the first roll pass and a low tension, the steel sheet surface having waviness in the sheet width direction is elongated to spread in the sheet width direction, the entire metal chromium layer and the entire hydrated chromium oxide layer are rolled, and rolling force is applied equally to the whole surface.

The concentration of Fe from the surface of the hydrated chromium oxide layer to a depth of 10 nm can be reduced by relieving the tension applied in the direction of rolling the steel sheet and setting the rolling load at a high level from the initial roll pass in such a manner. In addition, the area ratio of the site having an arithmetic mean roughness Ra of 10 nm or more at the surface of the hydrated chromium oxide layer, and the arithmetic mean roughness Ra of the site having an arithmetic mean roughness Ra of less than 10 nm at the surface of the hydrated chromium oxide layer can be decreased.

The entire steel sheet can be forcedly homogeneously rolled by rolling the steel sheet at a greatly enhanced rolling load even in a case in which the steel sheet has waviness in the sheet width direction. However, an excessively high rolling load is not preferred because of resulting in an increase in the concentration of Fe from the surface of the hydrated chromium oxide layer to a depth of 10 nm, and in the deterioration of resistance against an electrolytic solution.

The cold rolling of the surface-treated steel sheet under the above-described rolling conditions allows the surface to be crushed, thereby decreasing the arithmetic mean roughness Ra, and allows the hydrated chromium oxide layer to be consolidated and hardened. As a result, the resin layer and the hydrated chromium oxide layer itself are suppressed from being damaged in a case in which the polyolefin resin layer is layered, whereby resistance to an electrolytic solution is enhanced. Specifically, an arithmetic mean roughness Ra becomes small in total, and resistance to an electrolytic solution is improved because the area ratio of the site having an arithmetic mean roughness Ra of 10 nm or more in a visual field of 1 μm in the hydrated chromium oxide layer is less than 20%, and the site having an arithmetic mean roughness Ra of less than 10 nm in a visual field of 1 μm has an arithmetic mean roughness Ra of 3 nm or less in a visual field of 1 μm.

A steel foil for an electrical storage device container similar to the present embodiment can be produced by forming a metal chromium layer and a hydrated chromium oxide layer on a steel foil; however, since such a steel foil for an electrical storage device container is not subjected to the rolling step, the conditions that the area ratio of a site having an arithmetic mean roughness Ra of 10 nm or more in a visual field of 1 μm is less than 20% in the hydrated chromium oxide layer, and a site having an arithmetic mean roughness Ra of less than 10 nm in a visual field of 1 μm has an arithmetic mean roughness Ra of 3 nm or less in a visual field of 1 μm are not satisfied, and the hydrated chromium oxide layer does not become hard. In the case of layering a polyolefin resin layer, the resin layer and the hydrated chromium oxide layer in itself are therefore easily damaged, thereby deteriorating resistance to an electrolytic solution. The polyolefin resin layer and the hydrated chromium oxide layer itself are also easily damaged in a case in which the steel foil for electrical storage device container is worked to make an electrical storage device container.

(Step of Forming Polyolefin Resin Layer)

Then, the polyolefin resin layer is formed on the hydrated chromium oxide layer of the steel foil for an electrical storage device container after the cold rolling. The polyolefin resin layer may be layered by a heat lamination method.

The steel foil for an electrical storage device container produced in such a manner worked into a container for an electrical storage device, further through press molding and the like. Electrodes are inserted into the container for an electrical storage device, and an organic electrolytic solution is injected into the container, thereby producing an electrical storage device. For example, use of, as the electrodes, a positive electrode and a negative electrode that can occlude and release lithium ions, and use of, as the organic electrolytic solution, an organic electrolytic solution containing a lithium salt enable a lithium ion secondary battery to be produced. A capacitor can be produced by the combination of an electrode including activated carbon, and an organic electrolytic solution.

In accordance with the present embodiment, the steel foil for an electrical storage device container, which has maintained adhesion to a resin layer even in an electrolytic solution, and has favorable corrosion resistance, the container for an electrical storage device, and the electrical storage device can be provided as described above.

EXAMPLES

Examples in the invention will now be described. However, each condition of Examples is a condition example adopted to confirm the feasibility and effects of the invention, and the invention is not limited to the condition example. The invention can adopt various conditions unless deviating from the gist of the invention and as long as achieving the object of the invention is achieved.

(Steel Foils 1 to 12 and Steel Foils C103 to C106)

Cold-rolled steel sheets having component compositions listed in Table 1 and having sheet thicknesses 120 μm and 140 μm were degreased and pickled, a metal chromium layer in a coating amount of from 60 to 140 mg/m$^2$ was then formed on each cold-rolled steel sheet by plating treatment and electrolytic chromic acid treatment, and a surface-treated steel sheet was then produced by forming a hydrated chromium oxide layer in a coating amount of from 7 to 25 mg/m$^2$ on a chromium amount basis on the cold-rolled steel sheet.

Then, such surface-treated steel sheets were cold-rolled under conditions listed in Table 2, thereby producing steel foils 1 to 12 and steel foils C103 to C106 including metal chromium layers and hydrated chromium oxide layers on the steel foils. "Tension" in Table 2 means a tension applied in a rolling direction in cold rolling. In the column of "tension", a numerical value on the left of "/" indicates a value in a unit of "MPa", and a numerical value on the right of "/" indicates a value in a unit of "kg/mm$^2$."

(Steel Foil C101)

A steel foil C101 was produced in the same manner as the manner of the above-described steel foil 1 except that a hydrated chromium oxide layer was not formed on a cold-rolled steel sheet.

(Steel Foil C102)

A steel foil C102 was produced in the same manner as the manner of the above-described steel foil 1 except that a metal chromium layer was not formed on a cold-rolled steel sheet.

(Steel Foil C107)

A steel foil C107 was produced in the same manner as the manner of the above-described steel foil 1 except that a surface-treated steel sheet was not cold-rolled.

TABLE 1

| | Steel component (% by mass) | | | | | | | | |
|---|---|---|---|---|---|---|---|---|---|
| | C | Si | Mn | P | S | Al | N | Ti | Nb |
| Al—K | 0.01 | 0.007 | 0.11 | 0.012 | 0.0009 | 0.09 | 0.002 | — | — |
| IF | 0.0019 | 0.009 | 0.012 | 0.0042 | 0.045 | 0.045 | 0.002 | 0.02 | 0.019 |

Table 2 shows the kinds of the cold-rolled steel sheets, the overall thicknesses of the surface-treated steel sheets, the coating amounts of the chromium layers, the coating amounts of the hydrated chromium oxide layers, cold-rolling conditions, the overall thicknesses of the steel foils, the coating amounts of the chromium layers after the rolling, the coating amounts of the hydrated chromium oxide layers after the rolling in the steel foils 1 to 12 and the steel foils C101 to C107.

Table 3 shows the mean value of the concentrations of Fe from a surface (0 nm) of the hydrated chromium oxide layer to a depth of 10 nm (hereinafter also referred to as "mean concentration of Fe at depth of 10 nm"), the area ratio of a site having an arithmetic mean roughness Ra of 10 nm or more in a visual field of 1 μm at the surface of the hydrated chromium oxide layer (hereinafter also referred to as "area ratio of site having Ra of 10 nm or more", the arithmetic mean roughness Ra of a site having an arithmetic mean roughness Ra of less than 10 nm in a visual field of 1 μm in a visual field of 1 μm at the surface of the hydrated chromium oxide layer (hereinafter also referred to as "Ra of site having Ra of less than 10 nm", and electrolytic solution resistance.

The measurement values in Table 2 and Table 3 were measured according to measurement methods described below.

(Method of Measuring Coating Amount of Cr and Coating Amount of Hydrated Cr Oxide)

Quantification was performed using an X-ray fluorescence spectrometer by the following method. First, a chromium count was measured by an X-ray fluorescence method, thereby measuring the total amount of Cr. For measured samples, nine samples in total were used by cutting three samples from a center and both ends in a width direction while changing the longitudinal position of a produced steel foil. Then, each sample was dipped in a 7.5 N sodium hydroxide solution at from 90 to 100° C. for 5 minutes, to remove a hydrated chromium oxide layer, a chromium count was measured by an X-ray fluorescence method, and the amount of chromium was measured by a calibration curve on the basis of a difference between the chromium count and a total amount, thereby obtaining the coating amount of hydrated chromium oxide layer on a chromium amount basis. Then, a metal chromium layer was completely removed by polishing, dipping in about 20% of heated sulfuric acid solution, or the like, the chromium count of ferrite was then measured, and the coating amount of metal chromium layer was determined by a calibration curve on the basis of the difference between the chromium count of the ferrite and the chromium count before the removal of the metal chromium layer.

(Method of Measuring Mean Concentration of Fe at Depth of 10 nm)

The concentration of Fe was analyzed by glow discharge optical emission spectrometry while a hydrated chromium oxide layer was etched to a depth of 1 μm by argon sputtering. The mean concentration of Fe was determined in a range of from a surface to 10 nm. The analysis was performed at nine positions in total by taking three positions from a center and both ends in a width direction while changing the longitudinal position of the produced steel foil.

The glow discharge atomic emission spectrochemical analysis was carried out in a discharge range of 4 mm φ under discharge conditions of an argon (Ar) pressure of 600 Pa and a normal mode with a constant power of 35 W using a GD-PROFILER2 manufactured by HORIBA, Ltd.

(Method of Measuring Area Ratio of Site Having Ra of 10 nm or More and Ra of Site Having Ra of Less than 10 nm)

In the case of first rolling a common cold-rolled steel sheet including a metal chromium layer and a hydrated chromium oxide layer, a case in which a surface (consolidated surface) with which a roll comes in contact, and which is sufficiently rolled, and has an arithmetic mean roughness Ra of less than 10 nm, and a surface (non-consolidated surface) with which the roll insufficiency comes in contact, and which is not sufficiently rolled, and has an arithmetic mean roughness Ra of 10 nm or more coexist in a surface allows a contrast to be generated between the consolidated surface and the non-consolidated surface in the case of obtaining a secondary electron image with a scanning electron microscope (SEM). This is because the surface roughness levels of the surfaces are significantly different from each other. In the secondary electron image, a surface with high roughness and large corrugation appears bright, and a surface with low roughness and small corrugation appears dark. Therefore, such adjustment that a sufficient contrast is obtained in the range of luminance in a visual field at a magnification of, for example, 1000 times, allows a consolidated surface to exhibit a dark (blackish) expression and a non-consolidated surface to exhibit a bright (whitish) expression in a case in which the consolidated surface and the non-consolidated surface coexist in the visual field.

Because the contrasts of a consolidated surface and a non-consolidated surface are greatly different from each other in a common steel material, the boundary between the surfaces is clear. In a case in which the boundary is unclear, however, the boundary between a high-luminance region (=non-consolidated surface) and a low-luminance region (=consolidated surface) becomes clear by adjusting a contrast so that a dot having maximum luminance in a visual field becomes the brightest dot, and a dot having minimum luminance in the visual field becomes the darkest dot, and by forming a histogram at the luminance of all the dots of the image.

Specifically, nine samples of around 5 mm are collected by taking three samples from a center and both ends in a width direction while changing a longitudinal position in a region without any flaw or foreign substance in a produced steel foil. The samples are fixed on an aluminum sample table or the like with a carbon tape, and subjected to Pt vapor deposition at 5 nm or more. Sufficient current was passed through the samples, SEM observation of each sample was then performed, and a secondary electron image at a magnification of 1000 times was stored as a digital image file. In such a case, focus is achieved at a high magnification of 10000 times or more, and a digital image of the region of a quadrangle measuring from 90 to 110 µm per side at 1000 times is captured with definition in which the region of the quadrangle measures from 900 to 1100 pixels per side. The image is converted into an 8-bit grayscale BMP file. In such a case, a drawing with a higher-definition gradation and pixel number may be captured, and the gradation and the pixel number may be compressed in the specified range by an average method without arbitrary degradation with image processing software or the like.

As an example, FIG. 9 illustrates an SEM photograph of 100 µm×90 µm (1070×963 pixels) cut from an SEM photograph (magnification of 1000 times) of the hydrated chromium oxide layer of the steel foil C103 illustrated in FIG. 2A. As another example, FIG. 13 illustrates an SEM photograph of 100 µm×90 µm (1070×963 pixels) cut from an SEM photograph (magnification of 1000 times) of the hydrated chromium oxide layer of the steel foil 1 illustrated in FIG. 3A.

As illustrated in the SEM photograph of FIG. 9 and the SEM photograph of FIG. 13, each dot in the SEM photographs is represented by any one of 256 numerical values of gradation of from 0 to 255 in which a full black color is represented by "0", and a full white color is represented by "255." However, since raw data includes pixel-order fine noise, the file of the raw data is subjected to filtering in which the mean value of from 3 to 9 pixel dots around each pixel dot is determined, thereby removing such noise.

In the data after having been subjected to the above-described noise rejection, a maximum luminance value is converted into high gradation levels of from 200 to 253, and a minimum luminance value is converted into low gradation levels of from 5 to 100 by appropriately adjusting a contrast in a visual field in a stage of capturing a secondary electron image. In order to clearly distinguish the dark site of a consolidated portion subjected to sufficient rolling and the bright site of a non-consolidated portion subjected to insufficient rolling from each other, it is necessary to adjust luminance and a contrast so that maximum luminance and minimum luminance fall within the above-described range. In a case in which maximum luminance and the minimum luminance values do not fall within the gradation, the gain and contrast of the first captured secondary electron image are adjusted, the image is adjusted so that the maximum luminance and minimum luminance values fall within the above-described range, thereby generating an image file.

In order to distinguish a consolidated portion and a non-consolidated portion from each other in an SEM photograph, the luminance data of each dot may be captured from the SEM photograph data, and a histogram with respect to the luminance may be drawn. In an SEM photograph of a sample in which a consolidated portion exists, a peak from the low-luminance dark site of the consolidated portion exists in the low-luminance region of a histogram. Because smooth surfaces are generated in such consolidated portions by rolling, the roughness value of each consolidated portion is also low. The surfaces with relatively uniform roughness are generated among the consolidated surfaces, luminance is distributed in a narrow luminance range, and the peak is therefore formed. The data of the bright portion of the non-consolidated portion forms a histogram distributed in a high luminance side from the peak to foot of the consolidated portion (see FIG. 10 and FIG. 14). FIG. 10 is a view illustrating a histogram with respect to luminance in the SEM photograph of FIG. 9. FIG. 14 is a view illustrating a histogram with respect to luminance in the SEM photograph of FIG. 13.

For descriptive purposes, the luminance of the boundary between the non-consolidated portion and the consolidated portion may be set as a threshold value, a drawing may be generated by binarizing values that are more or less than the threshold value, and the number of pixels may be counted in order to calculate the area ratio of the non-consolidated portion in the histogram with respect to the luminance.

For descriptive purposes, the value of the bottom of the peak of the consolidated portion is regarded as the threshold value. For descriptive purposes, the inclination of the high-luminance side of the peak of the consolidated portion is regarded as luminance that linearly extends to a luminance axis and crosses the axis. In a case in which the inclination is unclear, a straight line may be determined by a least square method on the basis of the data of the luminance and frequency between both of luminance in which the peak frequency of the data of the luminance side of the peak of the consolidated portion is a frequency of 80% and luminance in which the peak frequency is a frequency of 50%, and an intersection point with the luminance axis may be determined and rounded off to obtain a value as the threshold value (see FIG. 11 and FIG. 15). FIG. 11 is a schematic view for explaining a method of determining a luminance threshold value between a consolidated portion and a non-consolidated portion from an enlarged view of the histogram illustrated in FIG. 10. FIG. 15 is a schematic view for explaining a method of determining a luminance threshold value between a consolidated portion and a non-consolidated portion from an enlarged view of the histogram illustrated in FIG. 14.

As an example, FIG. 12 illustrates an SEM photograph obtained by binarizing the SEM photograph of FIG. 9 with the luminance threshold value between the consolidated portion and the non-consolidated portion, determined from the enlarged view of the histogram illustrated in FIG. 10. In FIG. 9, the calculated area ratio of the non-consolidation region (white region) is 21.9%.

As another example, FIG. 16 illustrates an SEM photograph obtained by binarizing the SEM photograph of FIG. 13 with the luminance threshold value between the consolidated portion and the non-consolidated portion, determined from the enlarged view of the histogram illustrated in FIG. 14. In FIG. 13, the calculated area ratio of the non-consolidation region (white region) is 5.6%.

An Ra of 10 nm or less in a visual field of 1 µm in a consolidated surface and an Ra of 10 nm or more in a visual field of 1 µm in a non-consolidated surface were confirmed b) measuring a black region for the consolidated surface and a white region for the non-consolidated surface at positions located 1 µm or more apart from the boundary between the consolidated surface and the non-consolidated surface, respectively, with an AFM (atomic force microscope) on an SEM photograph (see FIG. 13) in which processing of presenting a region other than an effective consolidated region as a non-consolidated region (white region) was performed.

The area ratio of a site having an Ra of 10 nm or more was measured in each of the produced steel foil 1 to steel foil 12 and steel foil C101 to steel foil C107 by the above manipulation.

The Ra values of five different black regions on an SEM photograph were measured by AFM measurement, and the mean value of the Ra values was determined as the Ra of a site having an Ra of less than 10 nm. The five different black regions were selected in decreasing order of size in the photograph. The Ra of a site having an Ra of less than 10 nm was measured in each of the produced steel foil 1 to steel foil 12 and steel foil C101 to steel foil C106 by the following manipulation. Any site having an Ra of less than 10 nm was not present in the steel foil C107.

Determination on an SEM photograph may be difficult in a case in which the area ratio of a consolidated surface is very high, or in a case in which the area ratio of a non-consolidated surface is very high. In such a case, the Ra values, in a visual field of 1 µm, of 10 or more sites spaced as uniformly as possible without any flaw and foreign substance from optional locations in a sample are measured by AFM measurement, such sites having an Ra of 10 nm or more and an Ra of less than 10 nm in a visual field of 1 µm are regarded as the non-consolidated surface and the consolidated surface, respectively, and the ratio between the non-consolidated surface and the consolidated surface is determined.

Details on the SEM photographs taken with a scanning electron microscope (SEM) used in the measurement of the above-described area rates and Ra, and on the measurement of Ra with an atomic force microscope (AFM) will be described below.

(Method of Taking SEM Photograph with Scanning Electron Microscope (SEM))

The SEM photographs were obtained with a JSM-6500F, manufactured by JEOL Ltd., at an accelerating voltage of 5 kV. Platinum (Pt) of 5 nm was vapor-deposited on the samples, thereby securing conductivity.

(Method of Measuring Ra with Atomic Force Microscope (AFM))

The measurement of Ra with the atomic force microscope (AFM) was performed using an atomic force microscope (NANOSCOPE 5 manufactured by Bruker AXS K. K.). An MPPI 1100 manufactured by the company was used as a cantilever, and the curvature radius of the leading end of a probe was set at 8 nm.

The measurement mode of the atomic force microscope was set at a tapping mode. In order to obtain measurement data reflecting Ra originally possessed by a steel foil for a container (surface of hydrated chromium oxide layer), nine regions in total which were squares measuring 1 µm per side on the steel foil for a container were selected from a region seeming to have no flaw of the produced steel foil by selecting three regions of a center and both ends with respect to a width direction while changing a longitudinal position. The measurement was performed in the regions. The center of a region looking to be white (having high luminance) on such an SEM photograph is selected as a non-consolidated surface having an arithmetic surface roughness Ra of 10 nm or more, and the center of a region looking to be black (having low luminance) on such an SEM photograph was selected as a consolidated surface having an arithmetic surface roughness Ra of less than 10 nm. The measurement in the regions was repeated five times. In other words, the measurement was performed in the five regions of each of an optional consolidated surface or non-consolidated surface on the steel foil for a container top.

Flattening treatment of the measurement data in the five obtained regions was performed using software attached to the atomic force microscope, thereby calculating an arithmetic mean roughness Ra in each region. The mean value of Ra in each obtained region was regarded as the arithmetic mean roughness Ra of the consolidated surface or non-consolidated surface of the steel foil for a container.

(Method of Measuring Electrolytic Solution Resistance Before Working)

A polypropylene film having a thickness of 30 µm was laminated on a hydrated chromium oxide layer.

Nine specimens in total of 5 mm×40 mm were cut by taking three specimens from a center and both ends with respect to the width direction of a steel foil for a container on which the polypropylene film was laminated while changing a longitudinal position, were completely dipped in an electrolytic solution in a bottle that was able to be sealed with a lid and was made of polypropylene, and were retained at 80° C. for 7 days. A 1800 peel test in conformity with JIS K 6854-2 was conducted on both of the specimens and specimens that were not dipped in the electrolytic solution, thereby measuring the adhesion strengths of polypropylene films. A percentage made by a value obtained by dividing the adhesion strength of such a dipped specimen by the adhesion strength of such a specimen that was not dipped was evaluated as a decreasing rate. The lower decreasing ratio shows higher electrolytic solution resistance.

The decreasing ratio of the steel foil C102 in the present test was approximately 50%. A steel foil having a decreasing ratio of less than 30% was evaluated as A, showing that the steel foil was greatly more favorable than the steel foil C102. A steel foil having a decreasing ratio of around from 30 to 45% was evaluated as B, showing that the steel foil was more favorable than the steel foil C102. A steel foil having a decreasing ratio of around from 45 to 60% was evaluated as B-, showing that the steel foil was more favorable than the steel foil C102 but was inferior to "B." A steel foil having a decreasing ratio of around from 50 to 60% was evaluated as C, showing that the steel foil was equivalent to the steel foil C102. A steel foil having a decreasing ratio of 60% or more was evaluated as D, showing that the steel foil was poorer than the steel foil C102. A solution obtained by diluting lithium hexafluorophosphate ($LiPF_6$) with a solvent in which ethylene carbonate and diethyl carbonate were mixed at 1:1, to achieve a concentration of 1 mol/L, was used as the electrolytic solution.

(Method of Measuring Electrolytic Solution Resistance of Worked Portion)

A laminate steel foil was made by laminating a polypropylene film having a thickness of 30 µm on the hydrated chromium oxide layer formed on each of the steel foils which were the steel foils 1 to 12 and the steel foils C101 to 107. Drawing of the laminate steel foil was performed into a square cup shape which was a shape often used as an electrical storage device container. Press working by which the laminate steel foil was pressed into a square cup shape was performed under the following conditions.

The shape of a die hole of a die was set at a quadrangular shape having a height of 142 mm×a width of 142 mm and having a corner diameter of 4 mm, and a punch was allowed to have a shape having a height of 140 mm×a width of 140 mm and having a corner diameter of 4 mm. Press conditions were set at a fold pressure of 6 tons, use of a mixture of Johnson WAX 122 and machine oil at 1:1 as a lubricant, and a pressing speed of 60 mm/min.

The laminate steel foil having a height of 200 mm×a width of 200 mm was press-worked to a depth of 5 mm so that a surface on which the polypropylene film was laminated was allowed to face the punch. Nine specimens in total having a size having a width of around 5 mm and a length of around 40 mm including a corner were cut from this worked member by taking three specimens from a center and both ends with respect to a width direction while changing a longitudinal position.

Then, the specimens were completely dipped in an electrolytic solution in a bottle that was able to be sealed with a lid and was made of polypropylene, and were retained at 80°

C. for 7 days. It was confirmed by visual observation of each specimen whether or not the polypropylene film became loose. A specimen that did not become loose was evaluated as A, showing that the electrolytic solution resistance of a worked portion was excellent. A specimen that slightly became loose was evaluated as B. A specimen that became loose was evaluated as C, showing that the specimen was poor. The same electrolytic solution as the electrolytic solution used in the test of the electrolytic solution resistance before the working was used as the electrolytic solution.

TABLE 2

| | Surface-Treated Steel Sheet | | | | | | | Steel Foil | | |
|---|---|---|---|---|---|---|---|---|---|---|
| | Cold-Rolled Steel Sheet Kind | Overall Thickness μm | Coating Amount of Metal Chromium Layer mg/m² | Coating Amount of Hydrated Chromium Oxide Layer mg/m² | Cold-Rolling Conditions | | | Overall Thickness μm | Coating Amount of Metal Chromium Layer mg/m² | Coating Amount of Hydrated Chromium Oxide Layer mg/m² |
| | | | | | Tension MPa/ (kg/mm²) | Initial Rolling Force T | The Number of Passes Times | Cumulative Rolling Reduction % | | | |
| Steel Foil 1 | IF | 120 | 140 | 16 | 9.8/1 | 50 | 15 | 17 | 100 | 115 | 13 |
| Steel Foil 2 | Al—K | 120 | 60 | 16 | 9.8/1 | 50 | 15 | 17 | 100 | 50 | 13 |
| Steel Foil 3 | IF | 120 | 140 | 7 | 9.8/1 | 50 | 15 | 17 | 100 | 115 | 6 |
| Steel Foil 4 | Al—K | 120 | 60 | 7 | 9.8/1 | 50 | 15 | 17 | 100 | 50 | 6 |
| Steel Foil 5 | IF | 120 | 60 | 25 | 9.8/1 | 50 | 15 | 17 | 100 | 50 | 20 |
| Steel Foil 6 | Al—K | 120 | 140 | 25 | 9.8/1 | 50 | 15 | 17 | 100 | 115 | 20 |
| Steel Foil 7 | IF | 120 | 140 | 16 | 9.8/1 | 50 | 15 | 25 | 90 | 105 | 12 |
| Steel Foil 8 | Al—K | 120 | 140 | 16 | 9.8/1 | 50 | 20 | 30 | 85 | 100 | 11 |
| Steel Foil 9 | IF | 140 | 140 | 16 | 9.8/1 | 50 | 20 | 30 | 100 | 10 | 11 |
| Steel Foil 10 | Al—K | 120 | 140 | 16 | 19.6/2 | 50 | 10 | 17 | 100 | 115 | 13 |
| Steel Foil 11 | IF | 150 | 140 | 16 | 9.8/1 | 50 | 25 | 60 | 60 | 55 | 6 |
| Steel Foil 12 | Al—K | 150 | 140 | 25 | 9.8/1 | 50 | 30 | 80 | 30 | 30 | 5 |
| Steel Foil C101 | IF | 120 | 60 | <1 | 9.8/1 | 50 | 15 | 17 | 100 | 50 | <1 |
| Steel Foil C102 | Al—K | 120 | <1 | 7 | 9.8/1 | 50 | 15 | 17 | 100 | <1 | 6 |
| Steel Foil C103 | IF | 120 | 140 | 16 | 39.2/4 | 40 | 10 | 17 | 100 | 115 | 13 |
| Steel Foil C104 | Al—K | 120 | 140 | 16 | 19.6/2 | 50 | 10 | 58 | 50 | 60 | 7 |
| Steel Foil C105 | IF | 120 | 140 | 16 | 39.2/4 | 40 | 10 | 58 | 50 | 6 | 7 |
| Steel Foil C106 | Al—K | 150 | 140 | 16 | 9.8/1 | 50 | 40 | 90 | 15 | 15 | 2 |
| Steel Foil C107 | IF | 120 | 140 | 16 | — | — | — | — | 120 | 140 | 16 |

TABLE 3

| | Results | | | | |
|---|---|---|---|---|---|
| | Mean Concentration of Fe at Depth of 10 nm % by mass | Area Ratio of Site Having Ra of 10 nm or More % | Ra of Site Having Ra of 10 nm or Less nm | Electrolytic Solution Resistance before Working | Electrolytic Solution Resistance of Worked Portion |
| Steel Foil 1 | <1 | 5.6 | 2.5 | A | A |
| Steel Foil 2 | 1 | 5.5 | 2.5 | B | A |
| Steel Foil 3 | 1 | 5.4 | 2.4 | B | A |
| Steel Foil 4 | 2 | 5.8 | 2.3 | B | A |
| Steel Foil 5 | 1 | 5.5 | 2.5 | B | A |
| Steel Foil 6 | 0.5 | 5.6 | 2.6 | A | A |
| Steel Foil 7 | 1 | 7.5 | 2.6 | B | A |
| Steel Foil 8 | 2 | 12.4 | 2.8 | B | A |
| Steel Foil 9 | 3 | 12.5 | 2.7 | B- | A |
| Steel Foil 10 | 2 | 5.7 | 2.5 | B- | A |
| Steel Foil 11 | 6 | 0.3 | 2.5 | B | A |
| Steel Foil 12 | 8 | 0.2 | 2.4 | B- | A |
| Steel Foil C101 | 1 | 22.3 | 2.3 | D | B |
| Steel Foil C102 | 2 | 21.5 | 2.5 | C | B |
| Steel Foil C103 | 8 | 21.9 | 3.6 | C | B |
| Steel Foil C104 | 12 | 0.8 | 3.8 | C | B |
| Steel Foil C105 | 16 | 0.7 | 3.5 | D | B |
| Steel Foil C106 | 12 | 0.3 | 3.5 | D | B |
| Steel Foil C107 | <1 | 100 | — (none) | C | C |

The steel foils 1 to 12 exhibited favorable electrolytic solution resistance, as shown in Table 2 and Table 3. In contrast, the steel foils C101 to C107 resulted in poor electrolytic solution resistance. The steel foils 1 to 12 of the invention also exhibited favorable electrolytic solution resistance in the sites worked into the shapes of electrical storage device containers. In contrast, the steel foils C101 to C107 also resulted in poor electrolytic solution resistance in the sites worked into the shapes of electrical storage device containers.

FIG. 1A and FIG. 1B illustrate SEM photographs of a hydrated chromium oxide layer before cold rolling, FIG. 2A and FIG. 2B illustrate SEM photographs of the hydrated chromium oxide layer of the steel foil C103, and FIG. 3A and FIG. 3B illustrate SEM photographs of the hydrated chromium oxide layer of the steel foil 1. FIG. 1A, FIG. 2A, and FIG. 3A are the photographs at a magnification of 1000 times, and FIG. 1B, FIG. 2B, and FIG. 3B are the photographs at a magnification of 10000 times.

It is found that a surface of the hydrated chromium oxide layer before the cold rolling is roughened, as illustrated in FIG. 1. Gaps in the metal chromium layer, considered to be naturally generated in production, were also observed.

A surface of the steel foil C103 is rough in portions photographed white in FIG. 2A, and is flat in portions photographed black. The portions photographed white exist along a rolling direction (RD direction in the figure), as illustrated in FIG. 2A. FIG. 2B is an enlarged photograph of a portion photographed white.

The steel foil C103 was in a state in which rough surface portions and smooth surface portions coexisted, as illustrated in FIG. 2A and FIG. 2B. The reason thereof is considered to be as follows: the peak portions of waviness were strongly rolled and became flat, and the trough portions of the waviness were weakly rolled and remained rough in the cold rolling as a result of elongating the steel sheet only in the rolling direction and shrinking the steel sheet without elongating the steel sheet in a sheet width direction by the rolling because the tension of the rolling direction in the rolling was enhanced in a case in which the steel sheet before being cold-rolled had the waviness along the sheet width direction.

It is found that in the steel foil 1, many portions are photographed black on the whole, and the whole surface is flat, as illustrated in FIG. 3A. As for this, it is considered that the whole uniformly received a rolling load and was flattened as a result of elongating the steel sheet not only in a rolling direction but also in a sheet width direction by the rolling because the tension of the rolling direction in the rolling was decreased in a case in which the steel sheet before being cold-rolled had waviness along the sheet width direction.

FIG. 4 indicates the results of depth analysis of constituent elements in the hydrated chromium oxide layer before the cold rolling, FIG. 5 indicates the results of depth analysis of constituent elements in the hydrated chromium oxide layer of the steel foil C103, and FIG. 6 indicates the results of depth analysis of constituent elements in the hydrated chromium oxide layer of the steel foil 1.

The hydrated chromium oxide layer before the cold rolling has an Fe concentration of approximately 0% from a surface to a depth of 10 nm, as indicated in FIG. 4.

In contrast, the hydrated chromium oxide layer of the steel foil C103 has an Fe concentration of more than 5% from a surface to a depth of 10 nm, as indicated in FIG. 5. The reason thereof is considered to be as follows: because the tension in the rolling direction in the rolling was enhanced, the trough portions (recesses) of the waviness were elongated without being rolled in the cold rolling, the metal chromium layer was divided in the portions, the filling effect of portions, into which the metal chromium layer was divided, due to hydrated chromium oxide was not exhibited, and therefore, Fe of an undercoat was partly exposed. It is considered that as a result, the electrolytic solution resistance of the steel foil C103 was deteriorated.

The hydrated chromium oxide layer of the steel foil 1 has an Fe concentration of less than 5% from a surface to a depth of 10 nm, as indicated in FIG. 6. The reason thereof is considered to be as follows: because the tension in the rolling direction in the rolling was decreased, the entire hydrated chromium oxide layer was uniformly rolled in the cold rolling, and Fe of an undercoat was not exposed. It is considered that as a result, the electrolytic solution resistance of the steel foil 1 was improved.

FIG. 7A and FIG. 7B illustrate SEM photographs of the hydrated chromium oxide layer of the steel foil C105, and FIG. 8 indicates the results of depth analysis of constituent elements in the hydrated chromium oxide layer of the steel foil C105. FIG. 7A is the photograph at a magnification of 1000 times, and FIG. 7B is the photograph at a magnification of 10000 times.

In the steel foil C105, many portions were photographed black as a whole, as illustrated in FIG. 7A and FIG. 7B, and the whole surface became flat because the tension in the rolling direction was enhanced, the cumulative rolling reduction was enhanced, and a very strong rolling load was applied.

The steel foil C105 is favorable in view of surface roughness, as described above. However, the steel foil C105 has an Fe concentration of more than 10% from a surface to a depth of 10 nm, as indicated in FIG. 8. This is considered to be because Fe of an undercoat was exposed as a whole due to the application of a rolling load in the rolling. It is considered that as a result, the electrolytic solution resistance of the steel foil C105 was deteriorated.

The steel foil C106 is also favorable in view of surface roughness due to a very high cumulative rolling reduction, but has an Fe concentration of more than 10% from a surface to a depth of 10 nm. It is considered that as a result, the electrolytic solution resistance of the steel foil C106 was deteriorated.

It is considered that the steel foil C107 was a steel foil that was not cold-rolled, had a hydrated chromium oxide layer that was not consolidated, had a surface remaining rough, and therefore had deteriorated electrolytic solution resistance.

An observation that the finely cracked gaps in the metal chromium layer, naturally generated in the production of the steel sheet, disappeared after the rolling was made based on the states of the surfaces of the steel foils of FIG. 1 to FIG. 3. This shows that the hydrated chromium oxide layer filled into the gaps in the metal chromium layer is layered.

The invention claimed is:

1. A steel foil for an electrical storage device container, the steel foil comprising a steel foil, a metal chromium layer layered on the steel foil, and a hydrated chromium oxide layer layered on the metal chromium layer, wherein:
 a coating amount of the metal chromium layer formed on the steel foil is in a range of from 30 to 170 mg/m$^2$,
 a concentration of Fe from a surface of the hydrated chromium oxide layer to a depth of 10 nm is less than 10% by mass, an area ratio of a site having an arithmetic mean roughness Ra of 10 nm or more in a visual field of 1 μm at the surface of the hydrated chromium oxide layer is less than 20%, and a site having an arithmetic mean roughness Ra of less than 10 nm in a visual field of 1 μm comprises a portion within said site having an arithmetic mean roughness Ra of 3 nm or less in a visual field of 1 μm at the surface of the hydrated chromium oxide layer.

2. The steel foil for an electrical storage device container according to claim 1, wherein the hydrated chromium oxide layer is layered on the metal chromium layer in a state in which hydrated chromium oxide is filled into a gap in the metal chromium layer, which is finely cracked.

3. The steel foil for an electrical storage device container according to claim 1, wherein a total thickness of the steel foil, the metal chromium layer, and the hydrated chromium oxide layer is 100 μm or less.

4. The steel foil for an electrical storage device container according to claim 1, the steel foil further comprising a polyolefin-based resin layer coated on the surface of the hydrated chromium oxide layer.

5. The steel foil for an electrical storage device container according to claim 1, wherein the steel foil is a rolled steel foil.

6. The steel foil for an electrical storage device container according to claim 1, wherein the hydrated chromium oxide layer is a consolidated hydrated chromium oxide layer.

7. A container for an electrical storage device, the container comprising the steel foil for an electrical storage device container according to claim 4.

8. An electrical storage device comprising the container for an electrical storage device according to claim 7.

* * * * *